(12) United States Patent
Fukuchi et al.

(10) Patent No.: US 10,386,917 B2
(45) Date of Patent: Aug. 20, 2019

(54) IMAGE PROCESSING DEVICE, OBJECT SELECTION METHOD AND PROGRAM

(71) Applicant: SONY CORPORATION, Tokyo (JP)

(72) Inventors: Masaki Fukuchi, Tokyo (JP); Kouichi Matsuda, Tokyo (JP); Yasuhiro Suto, Tokyo (JP); Kenichiro Oi, Tokyo (JP); Jingjing Guo, Tokyo (JP)

(73) Assignee: SONY CORPORATION, Tokyo (JP)

( * ) Notice: Subject to any disclaimer, the term of this patent is extended or adjusted under 35 U.S.C. 154(b) by 147 days.

(21) Appl. No.: 15/711,198

(22) Filed: Sep. 21, 2017

(65) Prior Publication Data

US 2018/0018013 A1 Jan. 18, 2018

Related U.S. Application Data

(63) Continuation of application No. 15/052,335, filed on Feb. 24, 2016, now Pat. No. 9,778,735, which is a
(Continued)

(30) Foreign Application Priority Data

Jan. 12, 2010 (JP) .................. 2010-004170

(51) Int. Cl.
*G06F 3/00* (2006.01)
*H04N 5/44* (2011.01)
(Continued)

(52) U.S. Cl.
CPC .......... *G06F 3/005* (2013.01); *G06K 9/3241* (2013.01); *H04N 5/4403* (2013.01);
(Continued)

(58) Field of Classification Search
None
See application file for complete search history.

(56) References Cited

U.S. PATENT DOCUMENTS

| 5,887,216 A | 3/1999 | Motojama |
| 7,209,803 B2 | 4/2007 | Okamoto et al. |
| (Continued) | | |

FOREIGN PATENT DOCUMENTS

| EP | 2000953 | 12/2008 |
| JP | 11-345024 | 12/1999 |
| (Continued) | | |

OTHER PUBLICATIONS

Jun. 3, 2014, Japanese Office Action for related JP application No. 2010-004170.

(Continued)

*Primary Examiner* — Nicholas J Lee
(74) *Attorney, Agent, or Firm* — Paratus Law Group, PLLC

(57) ABSTRACT

There is provided an image processing device including: a data storage unit that stores object identification data for identifying an object operable by a user and feature data indicating a feature of appearance of each object; an environment map storage unit that stores an environment map representing a position of one or more objects existing in a real space and generated based on an input image obtained by imaging the real space using an imaging device and the feature data stored in the data storage unit; and a selecting unit that selects at least one object recognized as being operable based on the object identification data, out of the objects included in the environment map stored in the environment map storage unit, as a candidate object being a possible operation target by a user.

18 Claims, 20 Drawing Sheets

Related U.S. Application Data continuation of application No. 14/657,431, filed on Mar. 13, 2015, now Pat. No. 9,288,423, which is a continuation of application No. 14/190,321, filed on Feb. 26, 2014, now Pat. No. 9,014,431, which is a continuation of application No. 14/014,785, filed on Aug. 30, 2013, now Pat. No. 8,744,130, which is a continuation of application No. 13/670,750, filed on Nov. 7, 2012, now Pat. No. 8,548,199, which is a continuation of application No. 12/983,424, filed on Jan. 3, 2011, now Pat. No. 8,345,925.

(51) Int. Cl.

| | | |
|---|---|---|
| *H04N 21/41* | (2011.01) | |
| *H04N 21/422* | (2011.01) | |
| *H04N 21/4223* | (2011.01) | |
| *H04N 21/436* | (2011.01) | |
| *H04N 21/44* | (2011.01) | |
| *G06K 9/32* | (2006.01) | |

(52) U.S. Cl.
CPC ..... *H04N 21/4108* (2013.01); *H04N 21/4222* (2013.01); *H04N 21/4223* (2013.01); *H04N 21/42204* (2013.01); *H04N 21/42209* (2013.01); *H04N 21/42222* (2013.01); *H04N 21/43615* (2013.01); *H04N 21/44008* (2013.01); *G08C 2201/20* (2013.01); *H04N 2005/4408* (2013.01); *H04N 2005/4428* (2013.01); *H04N 2005/4435* (2013.01)

(56) References Cited

U.S. PATENT DOCUMENTS

| | | |
|---|---|---|
| 7,310,668 B2 | 12/2007 | Brown |
| 7,539,563 B2 | 5/2009 | Yang et al. |
| 7,681,194 B2 | 3/2010 | Van Ee et al. |
| 8,055,752 B1 | 11/2011 | Fong et al. |
| 8,089,455 B1 | 1/2012 | Wieder |
| 8,508,388 B2 | 8/2013 | Karlsson et al. |
| 2003/0007104 A1 | 1/2003 | Hoshino et al. |
| 2004/0231205 A1 | 11/2004 | Jen |
| 2010/0079374 A1 | 4/2010 | Cortenraad et al. |

FOREIGN PATENT DOCUMENTS

| | | |
|---|---|---|
| JP | 2003-018672 | 1/2003 |
| JP | 2004-320209 | 11/2004 |
| JP | 2008-304268 | 12/2008 |
| JP | 2009-105574 | 5/2009 |
| WO | WO2005/043484 | 5/2005 |
| WO | WO2007/048823 | 5/2007 |
| WO | WO2009/110204 | 9/2009 |

OTHER PUBLICATIONS

Oct. 8, 2013, Japanese Office Action for related JP application No. 2010-004170.

Dec. 20, 2012, EPO Communication for related EP Application No. 10 19 6760.

A. Davison, "Real-Time Simultaneous Localisation and Mapping with a Single Camera", Proceedings of the 9th IEEE International Conference on Computer Vision, vol. 2, pp. 1403-1410 (pp. 1-8) (2003).

Notice of Allowability from co-pending U.S. Appl. No. 12/983,424, dated Sep. 14, 2012, (9 pages).

T. Seifried, et al., "CRISTAL: A Collaborative Home Media and Device Controller Based on a Multi-touch Display", ITS '09 Proceedings of the ACM International Conference on Interactive Tabletops and Surfaces, Nov. 23-25, 2009, pp. 33-40.

FIG.10

EXAMPLE OF OBJECT IDENTIFICATION DATA

| ID | CLASSIFICATION | MODEL | OBJECT IMAGE | OPERABLE FLAG | COMMAND LIST |
|---|---|---|---|---|---|
| TV01 | TV | TV-SB-J11 |  | Yes | POWER ON, POWER OFF, VOLUME UP, VOLUME DOWN, CHANNEL UP, CHANNEL DOWN |
| SP01 | SPEAKER | SP-SS-K12 |  | Yes | POWER ON, POWER OFF, VOLUME UP, VOLUME DOWN |
| DV01 | DVD PLAYER | DV-SS-L13 |  | Yes | POWER ON, POWER OFF, VOLUME UP, VOLUME DOWN PLAYBACK, STOP, FAST-FORWARD, REWIND |
| PT01 | PRINTER | PT-CM-N14 |  | Yes | POWER ON, POWER OFF IMAGE PRINT |
| PD01 | PDA | PD-PP-N15 |  | No | ‒ |
| TB01 | TABLE | ‒ |  | No | ‒ |

IMAGE PROCESSING DEVICE, OBJECT SELECTION METHOD AND PROGRAM

CROSS-REFERENCE TO PRIOR APPLICATION

This application is a continuation of U.S. patent application Ser. No. 15/052,335 (filed on Feb. 24, 2016), which is a continuation of U.S. patent application Ser. No. 14/657,431 (filed on Mar. 13, 2015, and issued as U.S. Pat. No. 9,288,423 on Mar. 15, 2016), which is a continuation of U.S. patent application Ser. No. 14/190,321 (filed on Feb. 26, 2014, and issued as U.S. Pat. No. 9,014,431 on Apr. 21, 2015), which is a continuation of U.S. patent application Ser. No. 14/014,785 (filed on Aug. 30, 2013, and issued as U.S. Pat. No. 8,744,130 on Jun. 3, 2014), which is a continuation of U.S. patent application Ser. No. 13/670,750 (filed on Nov. 7, 2012, and issued as U.S. Pat. No. 8,548,199 on Oct. 1, 2013), which is a continuation of U.S. patent application Ser. No. 12/983,424 (filed on Jan. 3, 2011, and issued as U.S. Pat. No. 8,345,925 on Jan. 1, 2013), which claims priority to Japanese Patent Application No. 2010-004170 (filed on Jan. 12, 2010), which are all hereby incorporated by reference in their entirety.

BACKGROUND OF THE INVENTION

Field of the Invention

The present invention relates to an image processing device, an object selection method and a program.

Description of the Related Art

The number of electronic devices which users should operate at home or office is increasing year by year. Further, the functions of one electronic device are becoming increasingly diversified. Accordingly, a burden on a user who operates such electronic devices is getting heavier. In light of this, techniques for enabling the operation of a plurality of electronic devices with use of one remote control device have been developed. However, in order to achieve integration of remote control functions into one device, it is required to provide a means of identifying which device a user intends to operate when there are a plurality of remotely operable devices to be controlled in the environment where the user is located.

For example, Japanese Patent Application Laid-Open No. 11-345024 proposes a remote control device that recognizes a remote control target device and details of control from a speech of a user by employing speech recognition technology.

SUMMARY OF THE INVENTION

However, in the recognition of a remote control target device and details of control from a speech, recognition process becomes complicated when there are a plurality of same type devices, especially in distinguishing between them. For example, when television sets are located both in a living room and a room next to the living room, an intended television set cannot be specified appropriately unless a modifier is added, such as "the smaller" TV or TV "in the living room". Further, when a word that specifies a target device could not be recognized, there is a possibility that another device (another television or a device of another type) is turned off despite that a user intended to turn off one television.

Further, although a remote control target device and the like could be recognized from a gesture of a user, for example, it is difficult to distinguish between a plurality of devices that are located at positions which are lined up along the user's line of sight (or that are located in close proximity to each other) only with a gesture.

In light of the foregoing, it is desirable to provide novel and improved image processing device, object selection method and program capable of distinguishing between a plurality of electronic devices and easily selecting one as a target of remote control.

According to an embodiment of the present invention, there is provided an image processing device including: a data storage unit that stores object identification data for identifying an object operable by a user and feature data indicating a feature of appearance of each object; an environment map storage unit that stores an environment map representing a position of one or more objects existing in a real space and generated based on an input image obtained by imaging the real space using an imaging device and the feature data stored in the data storage unit; and a selecting unit that selects at least one object recognized as being operable based on the object identification data, out of the objects included in the environment map stored in the environment map storage unit, as a candidate object being a possible operation target by a user.

The image processing device may further include an image output unit that generates an output image for allowing a user to recognize a position on a screen of the candidate object selected by the selecting unit from the input image and outputs the generated output image to a display device.

The environment map storage unit may further store imaging position data indicating a position of the imaging device determined based on the input image and the feature data, and a position of each candidate object in the output image is calculated based on the environment map and the imaging position data stored in the environment map storage unit.

The image processing device may further include a user interface for allowing a user to specify an object to be operated, out of candidate objects.

The user interface may determine an object located at a center or near the center of the output image at a time when user input is detected, out of candidate objects, as the object to be operated.

When a plurality of candidate objects are located at the center of the output image when user input is detected, the user interface may determine the candidate object with a smallest size in the output image, out of candidate objects, as the object to be operated.

The feature data may include shape data indicating a three-dimensional shape of each object, and the image output unit may generate the output image by generating a frame surrounding each candidate object on the screen based on the shape data and superposing the generated frame on the input image.

The image processing device may further include: the imaging device and the display device, and an imaging plane of the imaging device and a screen of the display device are arranged to face opposite directions from each other.

According to another embodiment of the present invention, there is provided an image processing method in an image processing device including a data storage unit that stores object identification data for identifying an object operable by a user and feature data indicating a feature of appearance of each object, the method including steps of: generating an environment map representing a position of one or more objects existing in a real space based on an input image obtained by imaging the real space using an imaging device and the feature data stored in the data storage unit; and selecting at least one object recognized as being operable based on the object identification data, out of the objects included in the generated environment map, as a candidate object being a possible operation target by a user.

According to another embodiment of the present invention, there is provided a program for causing a computer for controlling an image processing device including a data storage unit that stores object identification data for identifying an object operable by a user and feature data indicating a feature of appearance of each object to function as: an environment map generating unit that generates an environment map representing a position of one or more objects existing in a real space based on an input image obtained by imaging the real space using an imaging device and the feature data stored in the data storage unit; and a selecting unit that selects at least one object recognized as being operable based on the object identification data, out of the objects included in the environment map generated by the environment map generating unit, as a candidate object being a possible operation target by a user.

According to the embodiment of the present invention described above, it is possible to provide an image processing device, an object selection method and a program capable of distinguishing between a plurality of electronic devices and easily selecting one as a target of remote control.

BRIEF DESCRIPTION OF THE DRAWINGS

FIG. 10 is an illustrative diagram for illustrating an example of a configuration of object identification data;

DETAILED DESCRIPTION OF THE EMBODIMENT(S)

Figure 1:
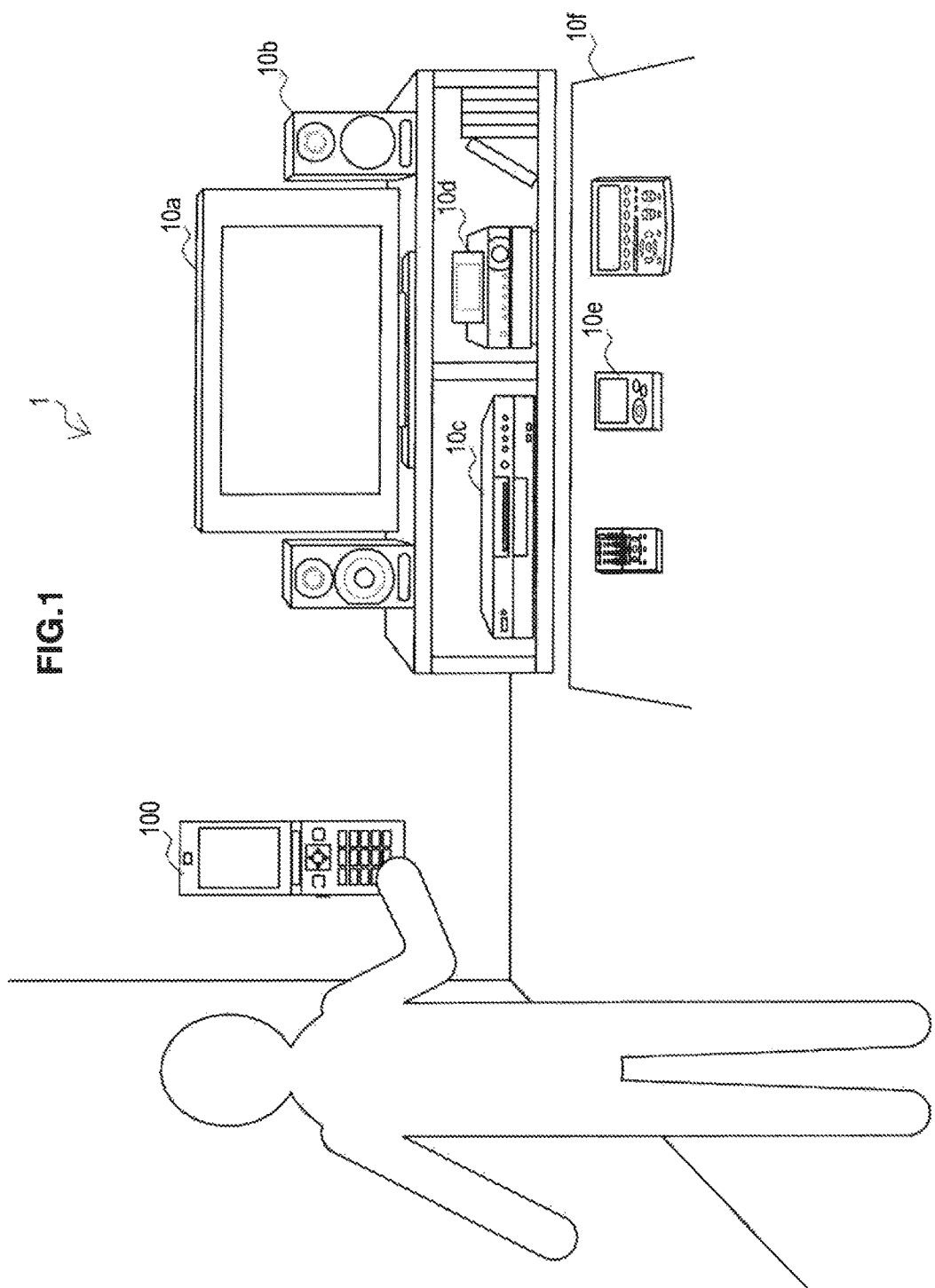
FIG. 1 is a schematic diagram for illustrating an overview of an image processing device according to an embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The "detailed description of the embodiment(s)" is described in a following order.

1. Overview of Image Processing Device According to Embodiment
2. Exemplary Configuration of Image Processing Device According to Embodiment
  2-1. Imaging Unit
  2-2. Environment Map Generating Unit
  2-3. Environment Map Storage Unit
  2-4. Data Storage Unit
  2-5. Device Recognizing Unit
  2-6. Selecting Unit
  2-7. Image Output unit
  2-8. User Interface
  2-9. Transmitting Unit
3. Hardware Configuration
4. Summary
5. Alternative Example 1. Overview of Image Processing Device According to Embodiment FIG. 1 is a schematic diagram for illustrating an overview of an image processing device according to an embodiment of the present invention. FIG. 1 illustrates an environment 1 where a user having an image processing device 100 according to an embodiment of the present invention is present.

Referring to FIG. 1, there are a plurality of objects including objects 10a, 10b, 10c, 10d, 10e and 10f inside the environment 1. The object 10a is a television, the object 10b is a speaker, the object 10c is a DVD player, the object 10d is a printer, the object 10e is a mobile information terminal, and the object 10f is a table. Of those objects, the objects 10a, 10b, 10c and 10d, for example, are controlled devices that can be controlled remotely. On the other hand, the objects 10e and 10f, for example, are objects that cannot be controlled remotely.

The image processing device 100 images the environment 1 by using an imaging device and thereby obtains a series of input images. Then, the image processing device 100 executes image processing according to an embodiment, which is described later, on the obtained input images and then displays an image output as a result of the image processing on a screen of the image processing device 100. The output image is an image that allows a user to recognize positions of candidate objects which are candidates for being operated by the user on the screen.

Further, the image processing device 100 preferably has a function as a remote control device as well. When the image processing device 100 functions as a remote control device, a user can specify an object to be operated based on the above-described output image displayed on the screen.

Note that, although a mobile phone terminal is illustrated as an example of the image processing device 100 in FIG. 1, the image processing device 100 is not limited to such an example. For example, the image processing device 100 may be an mobile phone terminal having an imaging device, a game terminal, a digital video camera or an electronic device of another type. Further, the image processing device 100 may be a robot having a camera as a vision and the like, for example. An example of a configuration of the image processing device 100 is described in further detail in the following sections.

2. Exemplary Configuration of Image Processing Device According to Embodiment

Figure 2:
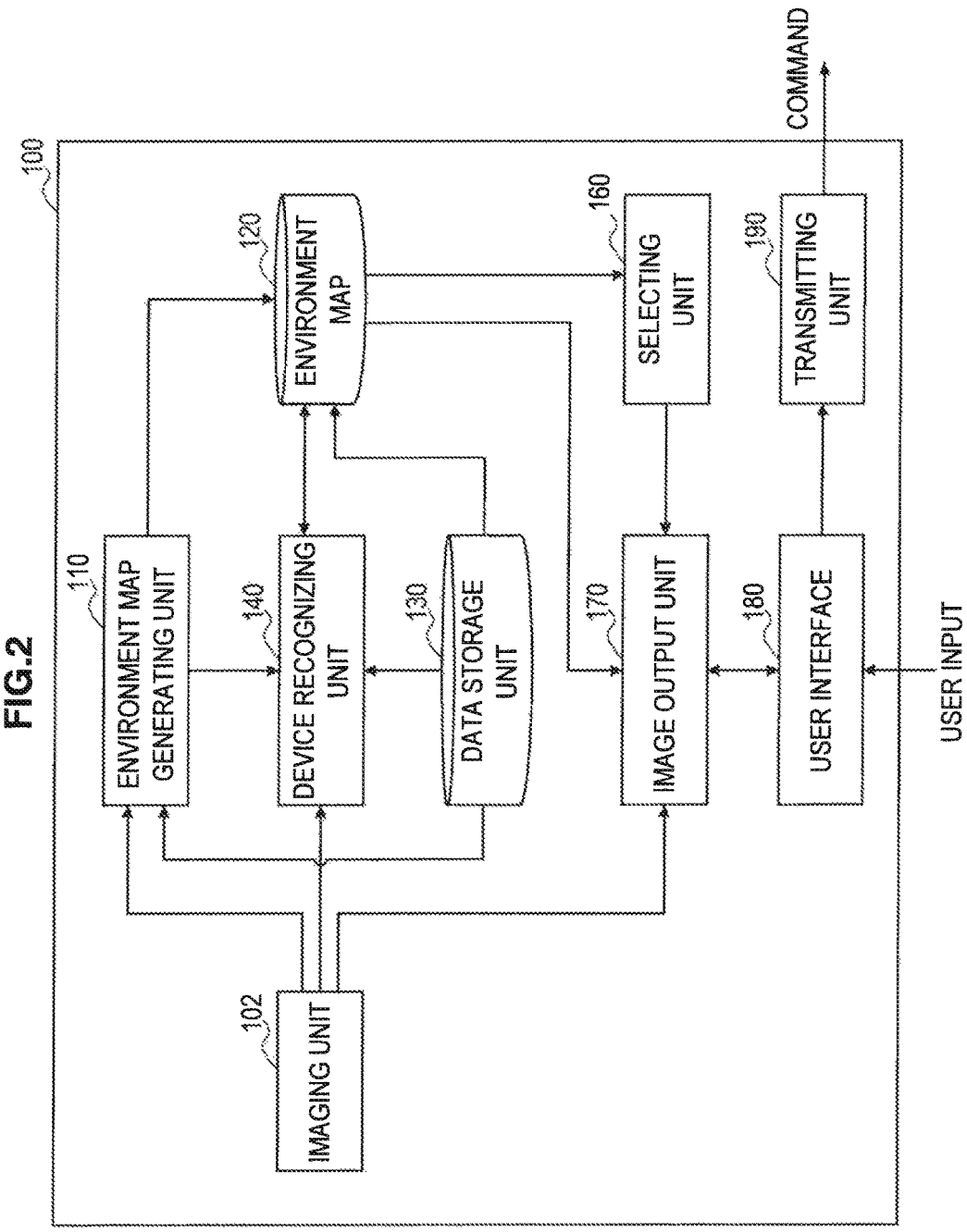
FIG. 2 is a block diagram illustrating an example of a configuration of an image processing device according to an embodiment.

FIG. 2 is a block diagram illustrating an example of a configuration of the image processing device 100 according to an embodiment of the present invention.

Referring to FIG. 2, the image processing device 100 includes an imaging unit 102, an environment map generating unit 110, an environment map storage unit 120, a data storage unit 130, a device recognizing unit 140, a selecting unit 160, an image output unit 170, a user interface 180, and a transmitting unit 190.

[2-1. Imaging Unit]

The imaging unit 102 may be realized as an imaging device having an imaging element such as a charge coupled device (CCD) or a complementary metal oxide semiconductor (CMOS), for example. The imaging unit 102 outputs an image generated by imaging the real space such as the environment 1 illustrated in FIG. 1 to the environment map generating unit 110, the device recognizing unit 140 and the image output unit 170 as the input image.

[2-2. Environment Map Generating Unit]

The environment map generating unit 110 generates an environment map, which represents positions of one or more objects present in the real space and the like based on the input image input from the imaging unit 102 and feature data of an object to be described later stored in the data storage unit 130.

Figure 3:
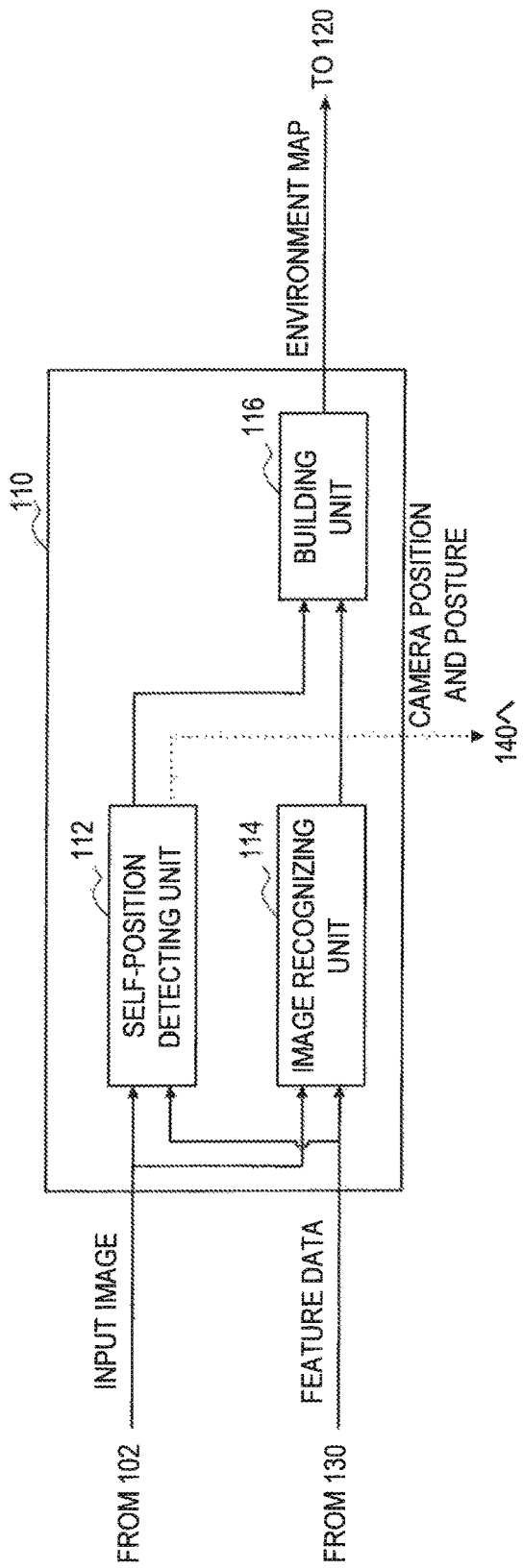
FIG. 3 is a block diagram illustrating an example of a detailed configuration of an environment map generating unit according to an embodiment.

FIG. 3 is a block diagram illustrating an example of a detailed configuration of an environment map generating unit according to an embodiment. Referring to FIG. 3, the environment map generating unit 110 includes a self-position detecting unit 112, an image recognizing unit 114, and a building unit 116.

(1) Self-Position Detecting Unit

The self-position detecting unit 112 dynamically detects a position of the imaging device, which takes the input image, based on the input image input from the imaging unit 102 and the feature data stored in the data storage unit 130. For example, also in a case in which the imaging device has a monocular camera, the self-position detecting unit 112 may dynamically determine a position and posture of the camera and a position of a feature point on an imaging plane of the camera for each frame by applying the SLAM technology disclosed in "Real-Time Simultaneous Localization and Mapping with a Single Camera" (Andrew J. Davison, Proceedings of the 9th IEEE International Conference on Computer Vision Volume 2, 2003, pp. 1403-1410).

First, entire flow of a self-position detection process by the self-position detecting unit 112 to which the SLAM technology is applied is described with reference to FIG. 4. Next, the self-position detection process is described in detail with reference to FIGS. 5 to 7.

Figure 4:
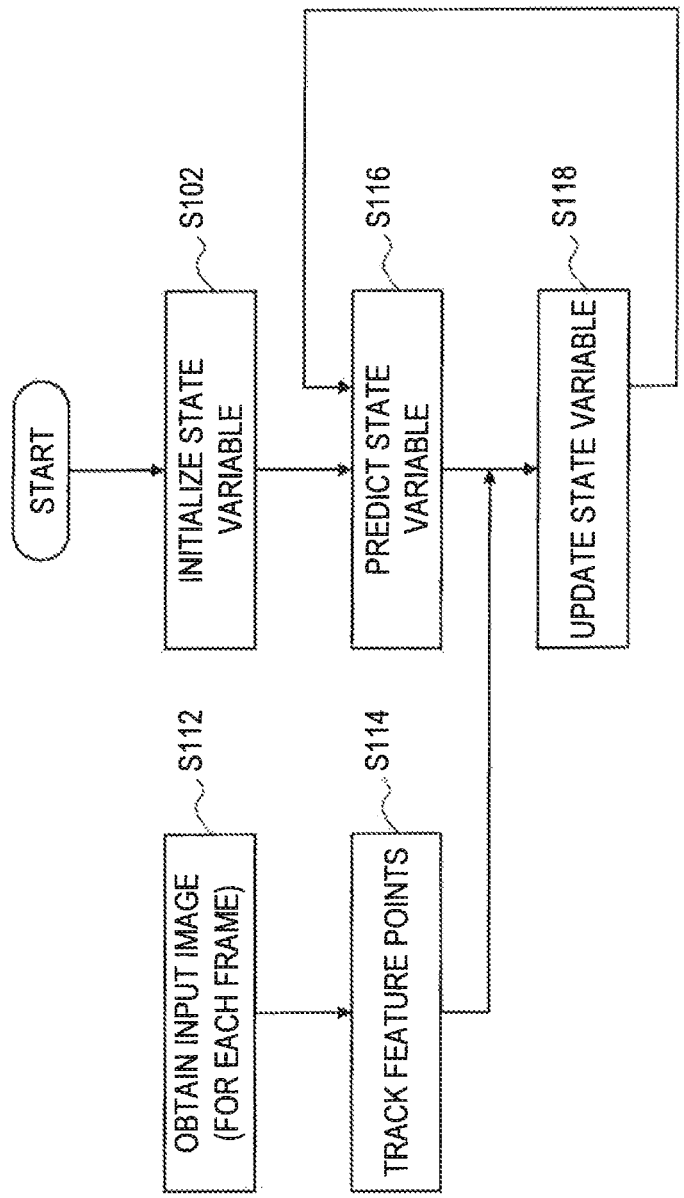
FIG. 4 is a flowchart illustrating an example of a flow of a self-position detection process according to an embodiment.

FIG. 4 is a flowchart illustrating an example of the flow of the self-position detection process by the self-position detecting unit 112 to which the SLAM technology is applied. In FIG. 4, when the self-position detection process starts, the self-position detecting unit 112 first initializes a state variable (step S102). In this embodiment, the state variable is a vector including the position and the posture (rotation angle) of the camera, a moving speed and an angular speed of the camera and the position of one or more feature points as an element. The self-position detecting unit 112 then sequentially obtains the input image from the imaging unit 102 (step S112). The processes from the step 112 to the step S118 may be repeated for each input image (that is, each frame).

At the step S114, the self-position detecting unit 112 tracks feature points present in the input image. For example, the self-position detecting unit 112 detects a patch (small image of 3×3=9 pixels around a feature point, for example) of each feature point stored in advance in the data storage unit 130 from the input image. The position of the patch herein detected, that is, the position of the feature point is used later when updating the state variable.

At the step S116, the self-position detecting unit 112 generates a predicted value of the state variable of next frame, for example, based on a predetermined prediction model. Also, at the step S118, the self-position detecting unit 112 updates the state variable using the predicted value of the state variable generated at the step S116 and an observed value according to the position of the feature point detected at the step S114. The self-position detecting unit 112 executes the processes at the steps S116 and S118 based on a principle of an extended Kalman filter.

As a result of such process, a value of the state variable updated for each frame is output. Configuration of each process of tracking of the feature point (step S114), prediction of the state variable (step S116) and updating of the state variable (step S118) are hereinafter described more specifically.

(1-1) Tracking of Feature Point

In this embodiment, the data storage unit 130 stores in advance the feature data indicating features of objects corresponding to physical objects which may be present in the real space. The feature data includes small images, that is, the patches regarding one or more feature points, each representing the feature of appearance of each object, for example. The patch may be the small image composed of 3×3=9 pixels around the feature point, for example.

Figure 5:
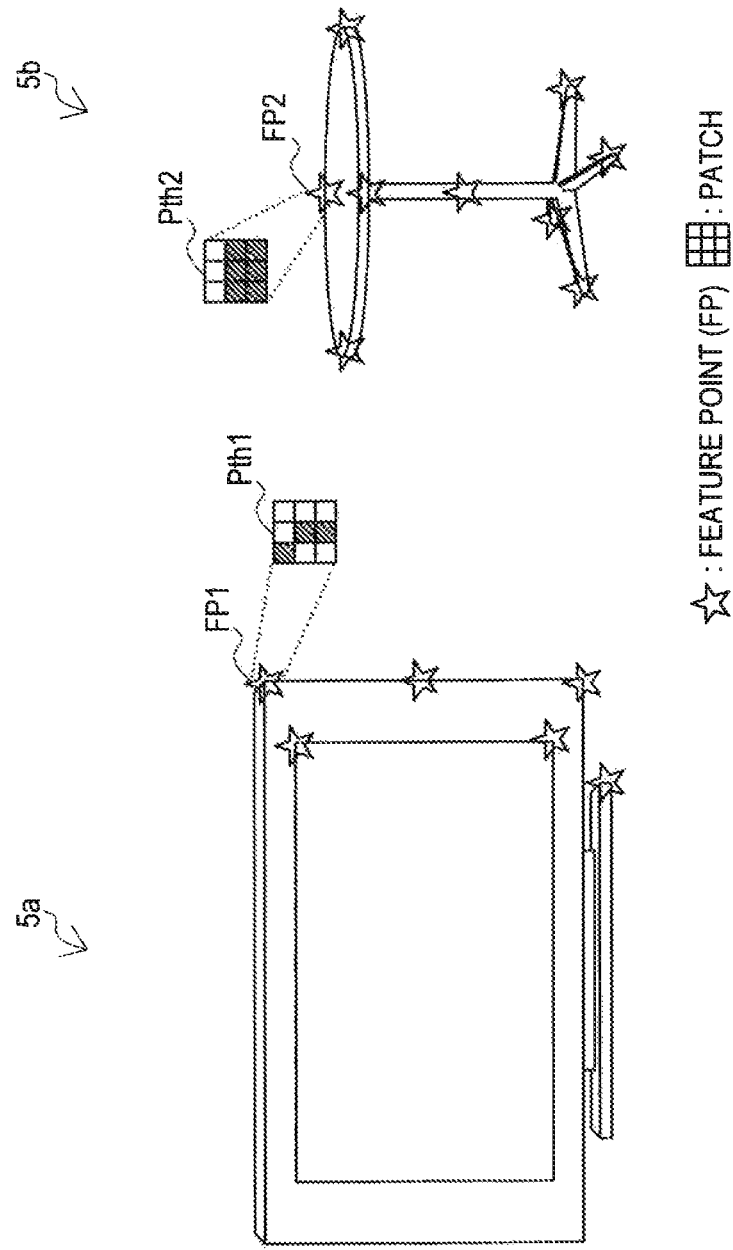
FIG. 5 is an illustrative diagram for illustrating a feature point set on an object.
Figure 6:
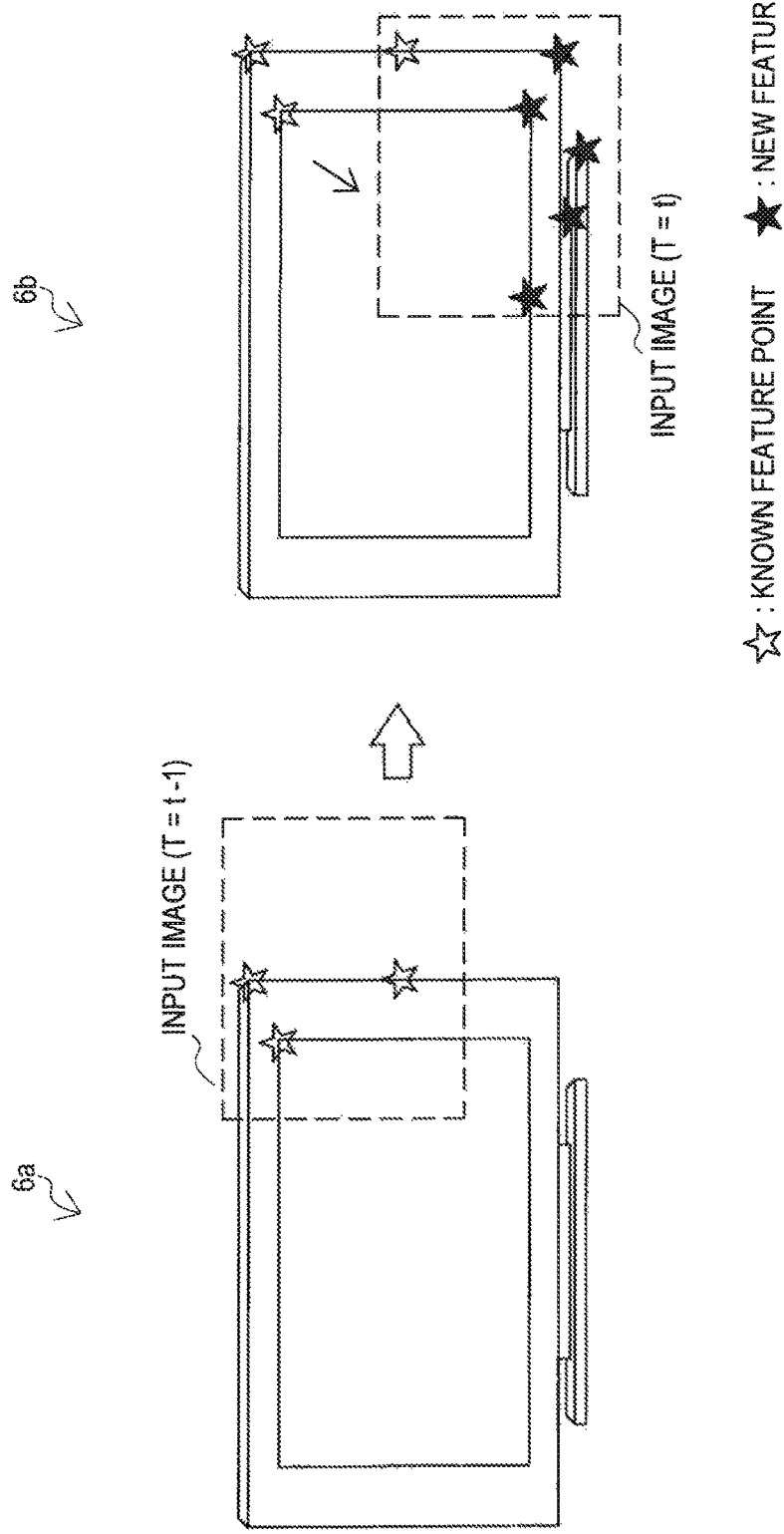
FIG. 6 is an illustrative diagram for illustrating addition of a feature point.

FIG. 5 illustrates two examples of the objects and an example of feature points (FPs) and patches set on each object. The object in the left side of FIG. 5 is the object representing a television (refer to FIG. 5a). A plurality of feature points including a feature point FP1 are set on the object. Further, a patch Pth1 is defined in relation to the feature point FP1. Meanwhile, the object in the right side of FIG. is the object representing a round table (refer to FIG. 5b). A plurality of feature points including a feature point FP2 are set on the object. Further, a patch Pth2 is defined in relation to the feature point FP2.

Upon obtaining an input image from the imaging unit 102, the self-position detecting unit 112 matches partial images included in the input image against the patch for each feature point illustrated in FIG. 5 stored in advance in the data storage unit 130. The self-position detecting unit 112 then specifies a position of each feature point included in the input image (a position of a center pixel of the detected patch, for example) as a result of the matching.

It should be noted that, for tracking feature points (step S114 in FIG. 4), it is not necessary to store data regarding all of the feature points to be tracked in the data storage unit 130 in advance. For example, three feature points are detected in the input image at time T=t−1 in an example illustrated in FIG. 6 (refer to FIG. 6*a*). Next, when the position or the posture of the camera changes at time T=t, only one of the three feature points present in the input image at the time T=t−1 is present in the input image. In this case, the self-position detecting unit 112 may newly set feature points at positions where a characteristic pixel pattern of the input image is present and use the new feature points in the self-position detection process for a subsequent frame. For example, in the example illustrated in FIG. 6, five new feature points are set on the object at the time T=t (refer to FIG. 6*b*). This is a feature of the SLAM technology, and according to this, a cost of setting all of the feature points in advance may be reduced and accuracy of the process may be improved using the increased number of feature points.

(1-2) Prediction of State Variable

In this embodiment, the self-position detecting unit 112 uses a state variable X expressed in the following equation as the state variable to be applied for the extended Kalman filter.

[Equation 1]

$$X = \begin{pmatrix} x \\ \omega \\ \dot{x} \\ \dot{\omega} \\ p_1 \\ \vdots \\ p_N \end{pmatrix} \quad (1)$$

The first element of the state variable X in the equation (1) represents a three-dimensional position of the camera in a global coordinate system (x, y, z) being a coordinate system set in the real space, as expressed in a following equation.

[Equation 2]

$$x = \begin{pmatrix} x_c \\ y_c \\ z_c \end{pmatrix} \quad (2)$$

Also, the second element of the state variable is a four-dimensional vector co having a quaternion as an element corresponding to a rotation matrix representing the posture of the camera. Note that, the posture of the camera may be represented using an Euler angle in place of the quaternion. Also, the third and the fourth elements of the state variable represent the moving speed and the angular speed of the camera, respectively.

Further, the fifth and subsequent elements of the state variable represent a three-dimensional position $p_i$ of a feature point $FP_i$ (i=1 ... N) in the global coordinate system as expressed in a following equation. Note that, as described above, the number N of the feature points may change during the process.

[Equation 3]

$$p_i = \begin{pmatrix} x_i \\ y_i \\ z_i \end{pmatrix} \quad (3)$$

The self-position detecting unit 112 generates the predicted value of the state variable for a latest frame based on the value of the state variable X initialized at the step S102 or the value of the state variable X updated in a previous frame. The predicted value of the state variable is generated according to a state equation of the extended Kalman filter according to multidimensional normal distribution as shown in the following equation.

[Equation 4]

$$\text{predicted state variable } \hat{X} = F(X,a) + w \quad (4)$$

Herein, F represents the prediction model regarding state transition of a system and "a" represents a prediction condition. Also, w represents Gaussian noise and may include a model approximation error, an observation error and the like, for example. In general, an average of the Gaussian noise w is 0.

Figure 7:
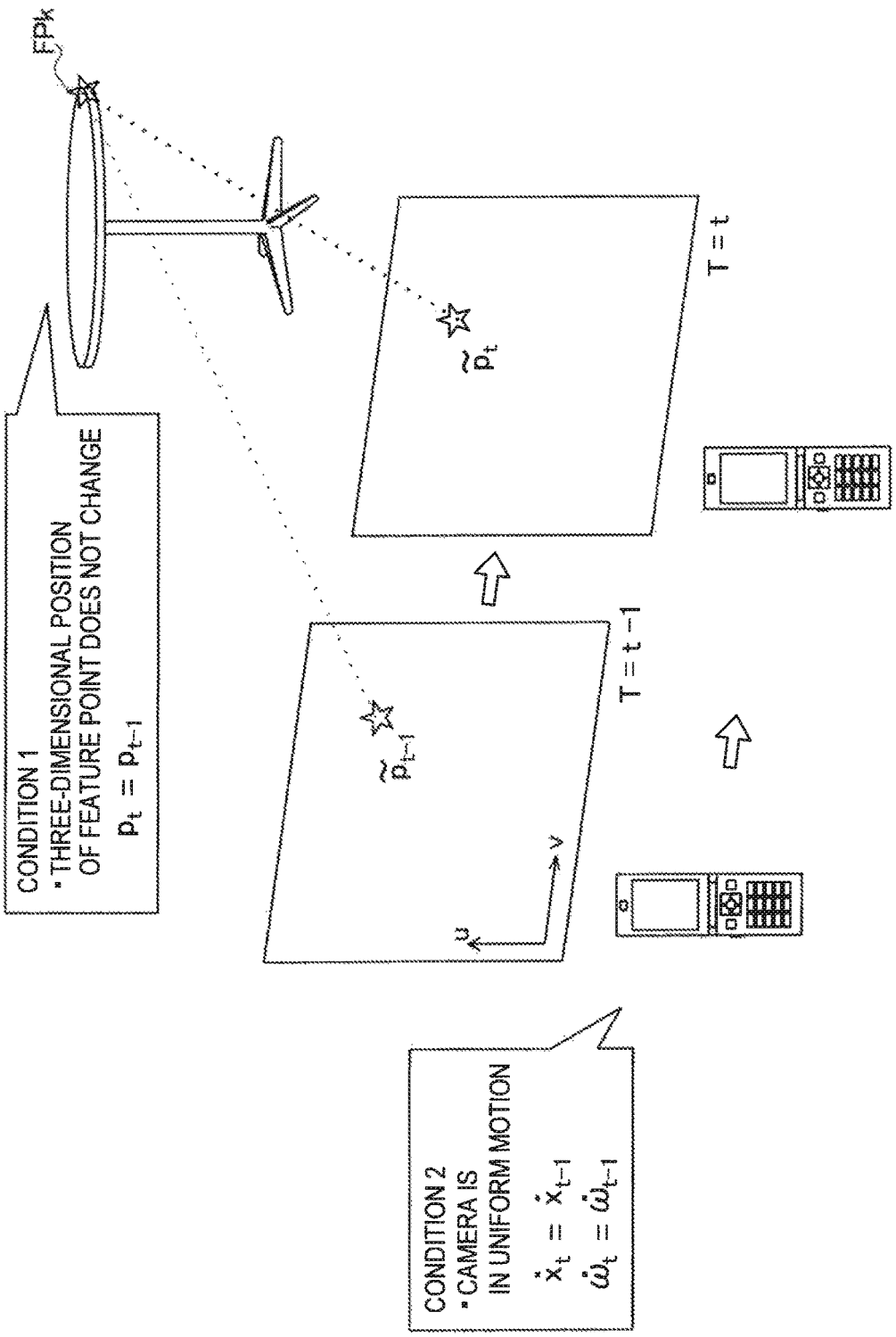
FIG. 7 is an illustrative diagram for illustrating an example of a prediction model.

FIG. 7 is an illustrative diagram for illustrating an example of the prediction model according to this embodiment. With reference to FIG. 7, two prediction conditions in the prediction model according to this embodiment are illustrated. First, as a first condition, suppose that the three-dimensional position of the feature point in the global coordinate system does not change. That is, provided that the three-dimensional position of the feature point FP1 at the time T is $p_T$, the following relationship is satisfied.

[Equation 5]

$$p_t = p_{t-1} \quad (5)$$

Next, as a second condition, suppose that motion of the camera is uniform motion. That is, a following relationship is satisfied for the speed and the angular speed of the camera from the time T=t−1 to the time T=t.

[Equation 6]

$$\dot{x}_t = \dot{x}_{t-1} \quad (6)$$

$$\dot{\omega}_t = \dot{\omega}_{t-1} \quad (7)$$

The self-position detecting unit 112 generates the predicted value of the state variable for the latest frame based on such prediction model and the state equation expressed in the equation (4).

(1-3) Updating of State Variable

The self-position detecting unit 112 then evaluates an error between observation information predicted from the predicted value of the state variable and actual observation information obtained as a result of feature point tracking, using an observation equation, for example. Note that, v in the equation (8) is the error.

[Equation 7]

$$\text{observation information } s = H(\hat{X}) + v \quad (8)$$

$$\text{predicted observation information } \hat{s} = H(\hat{X}) \quad (9)$$

Herein, H represents an observation model. For example, a position of the feature point $FP_i$ on the imaging plane (u-v plane) is defined as expressed in a following equation.

[Equation 8]

$$\text{position of } FP_i \text{ on imaging plane } \tilde{p}_i = \begin{pmatrix} u_i \\ v_i \\ 1 \end{pmatrix} \quad (10)$$

Herein, all of the position of the camera x, the posture of the camera ω and the three-dimensional position $p_i$ of the feature point $FP_i$ are given as the elements of the state variable X. Then, the position of the feature point $FP_i$ on the imaging plane is derived using a following equation according to a pinhole model.

[Equation 9]

$$\lambda \tilde{p}_i = AR_\omega (p_i - x) \quad (11)$$

Herein, λ represents a parameter for normalization, A represents a camera internal parameter, $R_\omega$ represents the rotation matrix corresponding to the quaternion ω representing the posture of the camera included in the state variable X. The camera internal parameter A is given in advance as expressed in the following equation according to characteristics of the imaging device, which takes the input image.

[Equation 10]

$$A = \begin{pmatrix} -f \cdot k_u & f \cdot k_u \cdot \cot\theta & u_O \\ 0 & -\dfrac{f \cdot k_v}{\sin\theta} & v_O \\ 0 & 0 & 1 \end{pmatrix} \quad (12)$$

Herein, f represents focal distance, θ represents orthogonality of an image axis (ideal value is 90 degrees), $k_u$ represents a scale along a longitudinal axis of the imaging plane (rate of change of scale from the global coordinate system to the coordinate system of the imaging plane), $k_v$ represents a scale along an abscissa axis of the imaging plane, and ($u_o$, $v_o$) represents a center position of the imaging plane.

Therefore, a feasible latest state variable X may be obtained by searching the state variable X, which makes the error between the predicted observation information derived using the equation (11), that is, the position of each feature point on the imaging plane and the result of feature point tracking at the step S114 in FIG. 4 minimum.

[Equation 11]

$$\text{latest state variable } X \leftarrow \hat{X} + \text{Innov}(s - \hat{s}) \quad (13)$$

The self-position detecting unit 112 outputs the position x and the posture ω of the camera (imaging device) dynamically updated by applying the SLAM technology in this manner to the building unit 116 and the device recognizing unit 140.

(2) Image Recognizing Unit

The image recognizing unit 114 specifies correspondences between physical objects present in the input image and data objects using the above-described feature data stored in the data storage unit 130. The feature data stored in the data storage unit 130 is described firstly.

(2-1) Feature Data

Figure 8:
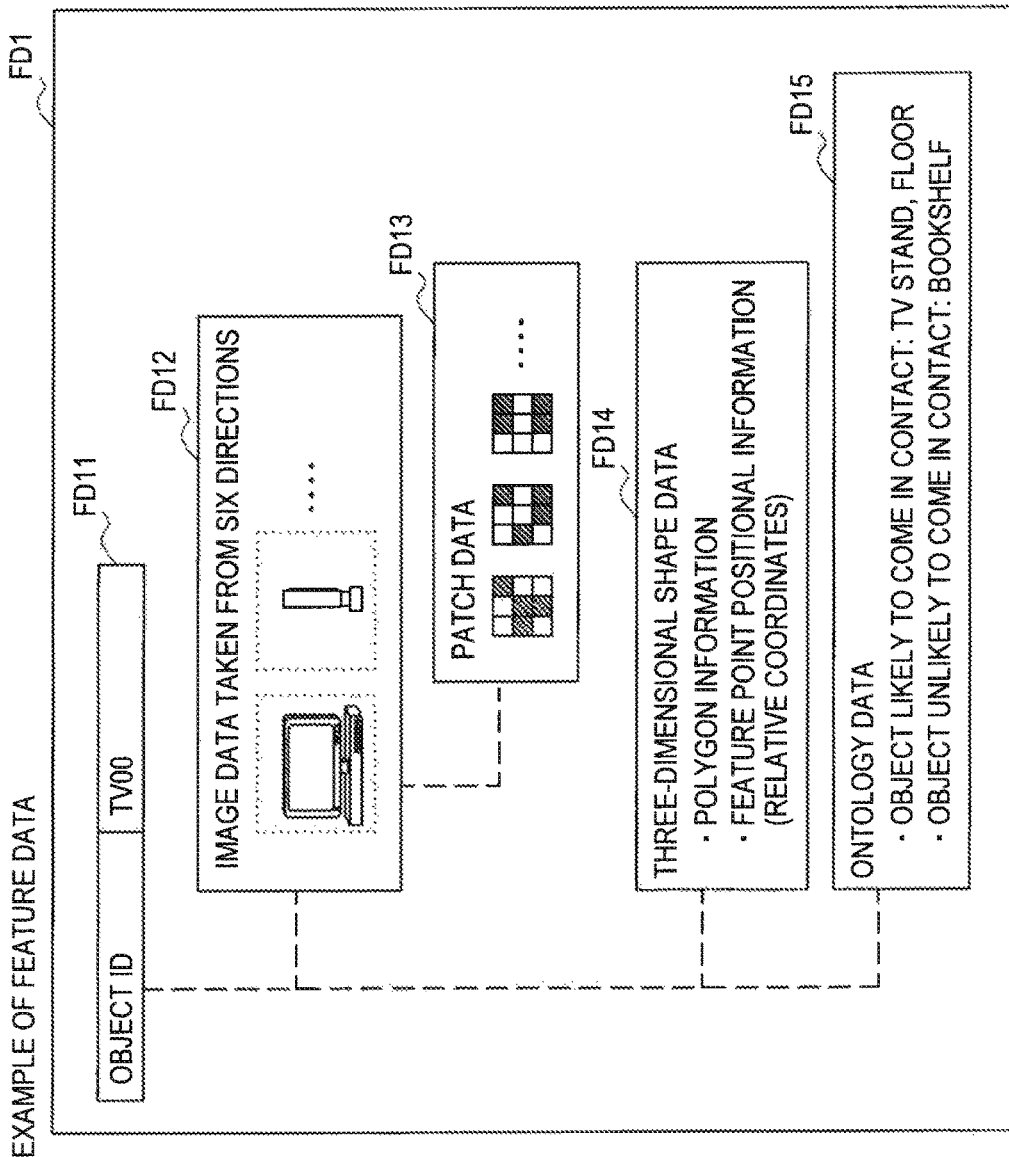
FIG. 8 is an illustrative diagram for illustrating an example of a configuration of feature data.

FIG. 8 is an illustrative diagram for illustrating an example of a configuration of feature data. Referring to FIG. 8, feature data FD1 about an object 10g as an example of the object is illustrated. The feature data FD1 includes an object identifier (ID) FD11, image data FD12 taken from six directions, patch data FD13, three-dimensional shape data FD14 and ontology data FD15.

The object identifier FD11 is a character string for uniquely identifying the object 10g. In the example of FIG. 8, the object identifier FD11 is "TV00".

The image data FD12 includes six image data obtained by taking images of the corresponding object from six directions (front, back, left, right, above and below), for example. The patch data FD13 is a set of small images around each feature point for each of one or more feature points set on each object. The image data FD12 and the patch data FD13 may be used for an object recognition process by the image recognizing unit 114 to be described later. Also, the patch data FD13 may be used for the above-described self-position detection process by the self-position detecting unit 112.

The three-dimensional shape data FD14 includes polygon information for recognizing a shape of the corresponding object and three-dimensional positional information of feature points. The three-dimensional shape data FD14 may be used for an environment map build process by the building unit 116 and an output image generation process by the image output unit 170 to be described later.

The ontology data FD15 is the data, which may be used to assist the environment map build process by the building unit 116, for example. In an example illustrated in FIG. 8, the ontology data FD15 indicates that the object 10g, which is the television, is likely to come in contact with an object corresponding to a television stand or a floor and is unlikely to come in contact with an object corresponding to a bookshelf.

(2-2) Object Recognition Process

Figure 9:
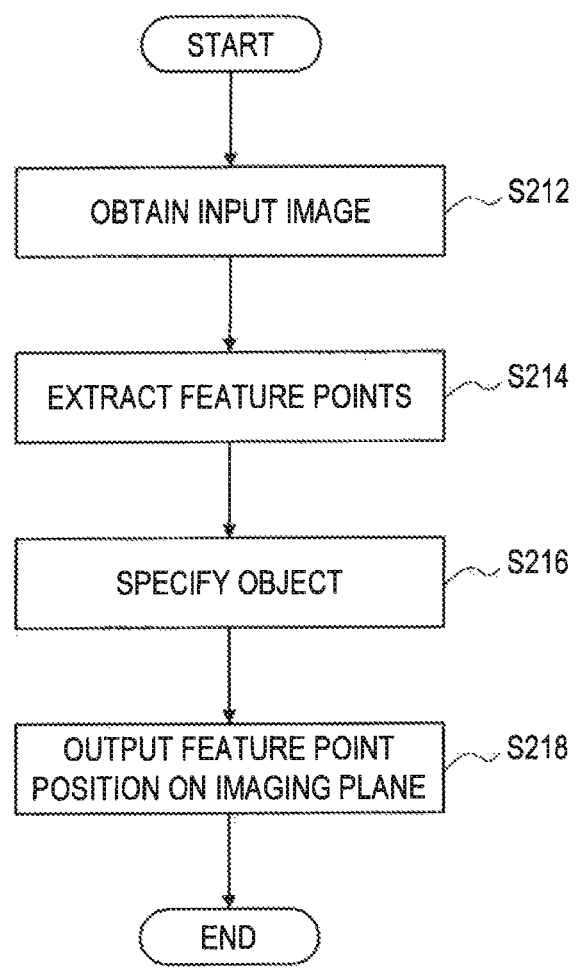
FIG. 9 is a flowchart illustrating an example of a flow of an object recognition process according to an embodiment.

FIG. 9 is a flowchart illustrating an example of flow of the object recognition process by the image recognizing unit 114. Referring to FIG. 9, the image recognizing unit 114 first obtains the input image from the imaging unit 102 (step S212). Next, the image recognizing unit 114 matches partial images included in the input image against patches of one or more feature points of each object included in the feature data to extract feature points included in the input image (step S214). It should be noted that the feature points used in the object recognition process by the image recognizing unit 114 and the feature points used in the self-position detection process by the self-position detecting unit 112 are not necessarily the same. However, when common feature points are used in the both processes, the image recognizing unit 114 may reuse the result of feature point tracking by the self-position detecting unit 112.

Next, the image recognizing unit 114 specifies the object present in the input image based on an extraction result of the feature point (step S216). For example, when the feature points belonging to one object are extracted with high density in a certain area, the image recognizing unit 114 may recognize that the object is present in the area. The image recognizing unit 114 then outputs the object identifier of the specified object and the position of the feature point belonging to the object on the imaging plane to the building unit 116 (step S218).

(3) Environment Map Building Unit

The building unit 116 generates the environment map using the position and the posture of the camera input from the self-position detecting unit 112, the positions of the feature points on the imaging plane input from the image recognizing unit 114 and the feature data stored in the data storage unit 130. In this specification, the environment map is a set of data indicating positions (and postures) of one or more objects present in the real space. The environment map may include object identifiers corresponding to objects, the three-dimensional positions of feature points belonging to the objects and the polygon information configuring shapes of the objects, for example. The environment map may be built by obtaining the three-dimensional position of each feature point according to the above-described pinhole model from the position of the feature point on the imaging plane input from the image recognizing unit 114, for example.

By deforming the relation equation of the pinhole model expressed in the equation (11), the three-dimensional position $p_i$ of the feature point $FP_i$ in the global coordinate system may be obtained by a following equation.

[Equation 12]

$$p_i = x + \lambda \cdot R_\omega^T \cdot A^{-1} \cdot \tilde{p}_i = x + d \cdot R_\omega^T \frac{A^{-1} \cdot \tilde{p}_i}{\|A^{-1} \cdot \tilde{p}_i\|} \quad (14)$$

Herein, d represents distance between the camera and each feature point in the global coordinate system. The building unit 116 may calculate such distance d based on the positions of at least four feature points on the imaging plane and the distance between the feature points for each object. The distance between the feature points is stored in advance in the data storage unit 130 as the three-dimensional shape data FD14 included in the feature data illustrated with reference to FIG. 8. It should be noted that, a calculation process of the distance d in the equation (14) is disclosed in detail in the above-described Japanese Patent Application Laid-Open No. 2008-304268.

After the distance d is calculated, remaining variables of a right side of the equation (14) are the position and the posture of the camera input from the self-position detecting unit 112 and the position of the feature point on the imaging plane input from the image recognizing unit 114, and all of which are known. The building unit 116 then calculates the three-dimensional position in the global coordinate system for each feature point input from the image recognizing unit 114 according to the equation (14). The building unit 116 then builds a latest environment map according to the three-dimensional position of each calculated feature point and outputs the built environment map to the environment map storage unit 120. It should be noted that, at that time, the building unit 116 may improve accuracy of the data of the environment map using the ontology data FD15 included in the feature data illustrated with reference to FIG. 8.

[2-3. Environment Map Storage Unit]

The environment map storage unit 120 stores the above-described environment map built by the building unit 116 of the environment map generating unit 110 using a storage medium such as a hard disk or a semiconductor memory. Further, the environment map storage unit 120 stores imaging position data including the position and the posture of the camera detected by the self-position detecting unit 112 of the environment map generating unit 110. It should be noted that the environment map storage unit 120 may be implemented using physically the same storage medium as the data storage unit 130 to be described next.

[2-4. Data Storage Unit]

The data storage unit 130 stores in advance the feature data indicating features of objects corresponding to physical objects which may be present in the real space using a storage medium such as a hard disk or a semiconductor memory as described above. Further, the data storage unit 130 stores in advance object identification data for identifying an object which is operable by a user, out of the physical objects which may be present in the real space. The object identification data is used in a device recognition process by the device recognizing unit 140 to be described later.

FIG. 10 is an illustrative diagram for illustrating an example of a configuration of object identification data. Referring to FIG. 10, the object identification data includes six data items: object identifier (ID), classification, model, object image, operable flag, and command list.

The object identifier is a character string for uniquely identifying each object corresponding to an individual physical object in the real space. The object identification data and the feature data illustrated with reference to FIG. 8 can be associated using such object identifier. In FIG. 10, the object identification data is illustrated for each of six objects with the object ID="TV01", "SP01", "DV01", "PT01", "PD01" and "TB01".

The classification indicates the type of each object. The types of the objects "TV01", "SP01", "DV01", "PT01", "PD01" and "TB01" are a television, a speaker, a DVD player, a printer, a PDA and a table, respectively. Further, the model indicates a model number of an individual physical object in the real space.

The object image is an image used for a device recognition process by the device recognizing unit 140 to be described later. The object image may be an image obtained by imaging an individual physical object in the real space from at least one direction. Further, the object image may be a part of the image data included in the feature data illustrated with reference to FIG. 8, for example.

The operable flag is a flag for identifying whether an individual physical object in the real space is operable by a user. When the operable flag="Yes", the physical object is operable. Further, when the operable flag="No", the physical object is not operable. In the example of FIG. 10, the operable flag of the objects "TV01", "SP01", "DV01" and "PT01" is "Yes". Thus, those objects are operable. On the other hand, the operable flag of the objects "PD01" and "TB01" is "No". Thus, those objects are not operable.

The command list is a list of control commands for operating an object for each of the operable objects. For example, in the command list of the object "TV01", the control commands of six types: "power on", "power off", "volume up", "volume down", "channel up" and "channel down" are included.

[2-5. Device Recognizing Unit]

The device recognizing unit 140 matches each object image included in the above-described object identification data against the input image input from the imaging unit 102 to thereby recognize an operable object present in the input image. Then, when the operable object exists, the device recognizing unit 140 calculates a three-dimensional position of each operable object in the environment map 120 according to the equation (14) using a position of each operable object in the input image and the position and the posture of the camera input from the self-position detecting unit 112. Further, the device recognizing unit 140 registers the newly recognized operable object in the environment map based on the calculated three-dimensional position.

Figure 11:
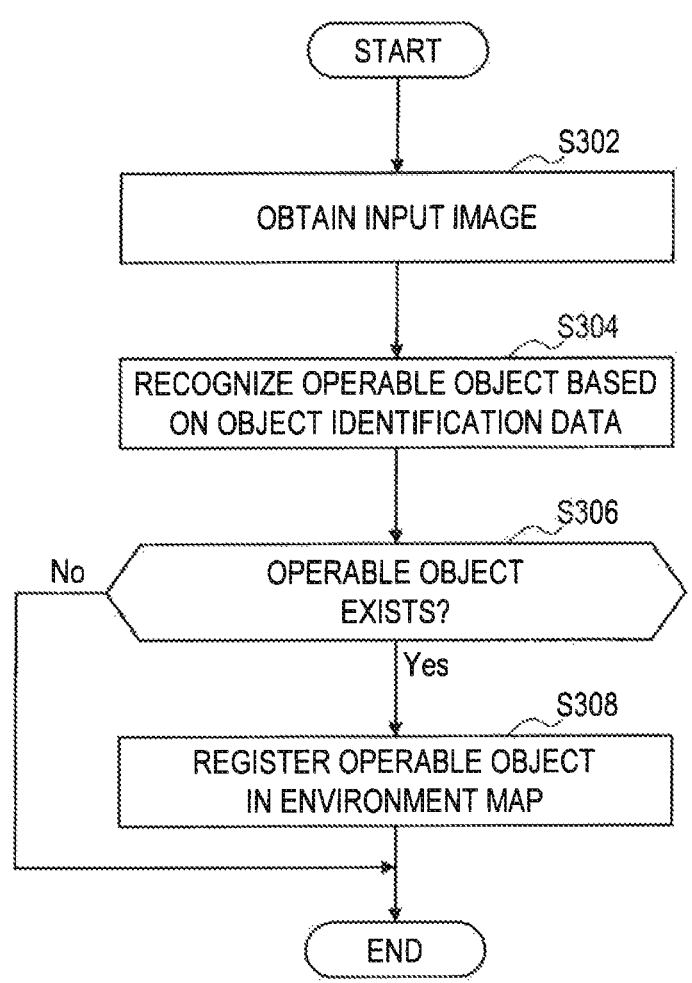
FIG. 11 is a flowchart illustrating an example of a flow of a device recognition process according to an embodiment.

FIG. 11 is an illustrative diagram illustrating an example of a flow of a device recognition process by the device recognizing unit 140. Referring to FIG. 11, the device recognizing unit 140 first obtains an input image from the imaging unit 102 (step S302). Next, the device recognizing unit 140 matches each object image included in the object identification data against the input image to thereby recognize an operable object present in the input image (step S304). The object image used for the matching may be the object image of a record with the operable flag of "Yes" out of the object images included in the object identification data. Next, the device recognizing unit 140 determines whether an operable object is recognized in the input image (step S306). When an operable object is not recognized in the input image, the process ends. On the other hand, when an operable object is recognized in the input image, the device recognizing unit 140 calculates a three-dimensional position of each of the recognized operable object and registers the newly recognized operable object in the environment map based on the three-dimensional position (step S308).

In this manner, a three-dimensional position in the environment map of the object recognized as being operable by the device recognizing unit 140 is kept stored in the environment map storage unit 120. Specifically, the object once recognized as being operable can be accurately identified in the environment map even when the object is hidden behind another object (that is, when occlusion occurs) due to movement of the camera or when appearance varies due to change in imaging direction.

[2-6. Selecting Unit]

The selecting unit 160 selects at least one object recognized as being operable based on the object identification data, out of the objects included in the environment map stored in the environment map storage unit 120, as a possible operation target by a user. The object selected as the possible operation target by the selecting unit 160 is referred to as a candidate object in this specification.

The selecting unit 160 may select all the objects with the operable flag of "Yes" in the object identification data, out of the objects included in the environment map, as the candidate objects, for example. Alternatively, when a plurality of operable objects are recognized in the input image, the selecting unit 160 may select only certain objects of a number not exceeding a preset threshold as the candidate objects, for example. The certain objects may be objects located at the center or near the center of the screen, for example. The position of the operable object on the screen may be calculated according to the equation (11) based on the environment map stored in the environment map storage unit 120 and the position and the posture of the camera. It should be noted that the operable object typically has a certain degree of size (an area indicated by the number of pixels, for example) on the screen. Therefore, the selecting unit 160 can determine the distance from the center of the screen by assuming a geometric center of gravity position of an operable object as a position of the operable object. Further, when a plurality of operable objects are located at the center of the screen, the selecting unit 160 may select the object with the smallest size on the screen as the candidate object, for example.

Figure 12:
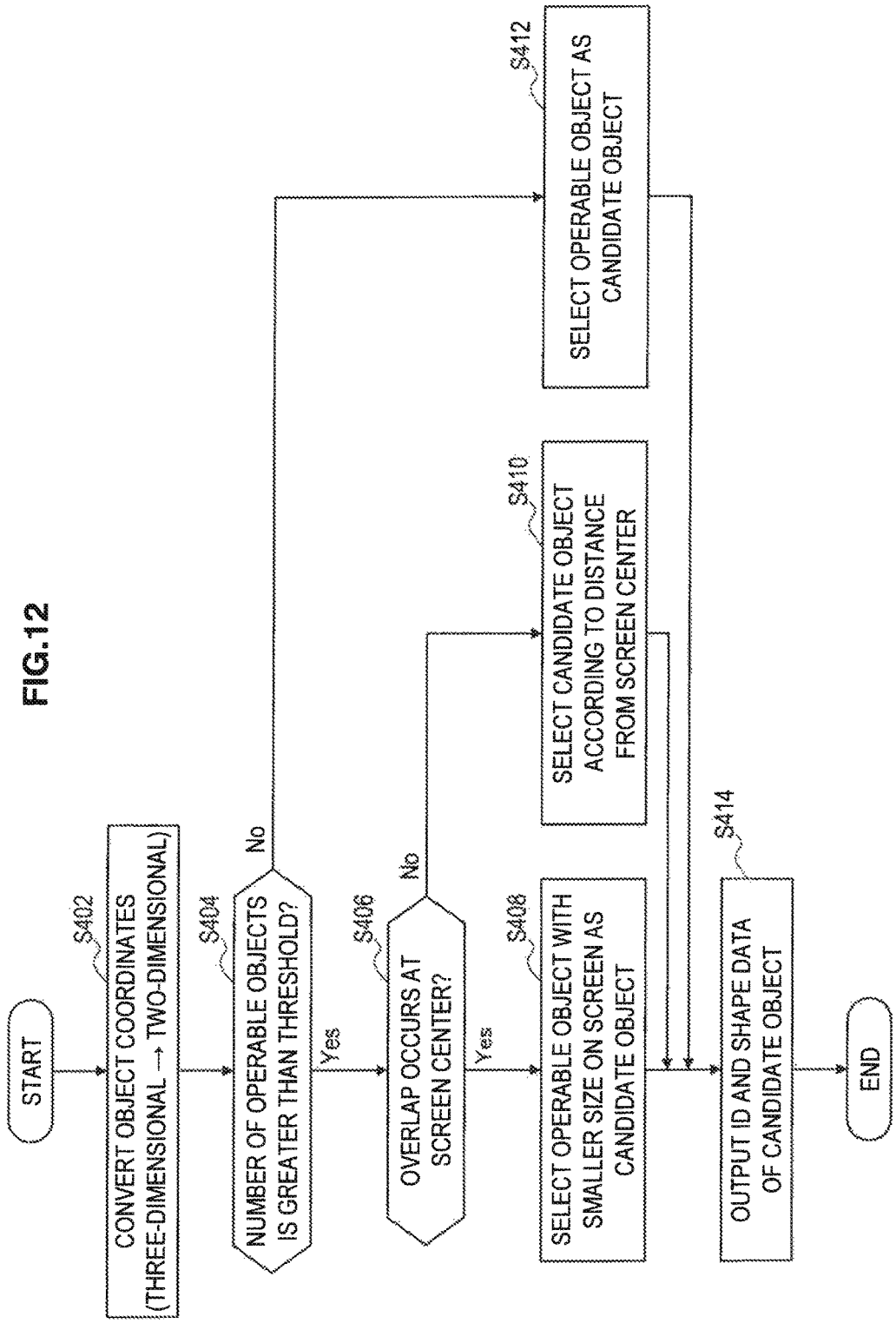
FIG. 12 is a flowchart illustrating an example of a flow of a candidate object selection process according to an embodiment.

FIG. 12 is an illustrative diagram illustrating an example of a flow of a selection process by the selecting unit 160. Referring to FIG. 12, the selecting unit 160 first converts three-dimensional coordinates of the object with the operable flag of "Yes" in the object identification data, out of the objects included in the environment map, into two-dimensional coordinates on the imaging plane according to the equation (11) (step S402). For example, by converting three-dimensional coordinates of a vertex of a polygon composing a shape of an object into two-dimensional coordinates on the imaging plane, the size and the center of gravity of each object on the imaging plane can be calculated. Next, the selecting unit 160 determines whether the number of operable objects projected on the imaging plane is greater than a preset threshold according to the equation (11) (step S404). The present threshold may be one or plural, for example. When the number of operable objects is not greater than the preset threshold, the process proceeds to step S412. On the other hand, when the number of operable objects is greater than the preset threshold, the process proceeds to step S406.

In the step S406, the selecting unit 160 determines whether a plurality of operable objects overlap at the center of the imaging plane (step S406). For example, when another object exists on a straight line extending from the position of the camera to the position of one object, a plurality of operable objects overlap on the imaging plane. When a plurality of operable objects overlap at the center of the imaging plane, the process proceeds to step S408. On the other hand, when a plurality of operable objects do not overlap at the center of the imaging plane, the process proceeds to step S410.

In the step S408, the selecting unit 160 selects the object with the smaller size on the screen (the object with the smallest size when the above-described threshold is 1), out of the plurality of operable objects located at the center of the imaging plane, as the candidate object (step S408). Further, in the step S410, the selecting unit 160 selects the operable objects of a number corresponding to the above-described threshold in ascending order of the distance from the center of the screen to the center of gravity of each object as the candidate object (step S410). Furthermore, in the step S412, the selecting unit 160 selects the operable object projected on the imaging plane as the candidate object (step S412).

After that, the selecting unit 160 outputs shape data indicating a two-dimensional shape (two-dimensional coordinates of a vertex of a polygon on the imaging plane and the like) of the selected candidate object to the image output unit 170 in relation to the object ID (step S414). Then, the selection process by the selecting unit 160 ends.

[2-7. Image Output Unit]

The image output unit 170 generates an output image for allowing a user to recognize the position on the screen of the candidate object selected by the selecting unit 160 from the input image input from the imaging unit 102. The image output unit 170 then outputs the generated output image to a display device. Specifically, the image output unit 170 generates the output image by generating a frame surrounding each candidate object on the screen based on two-dimensional shape data of the candidate object and superposing the generated frame on the input image, for example. Alternatively, the image output unit 170 may allow a user to recognize the position of the candidate object on the screen by differentiating tone, color shading and the like between an area on the screen corresponding to each candidate object and another area in the output image, for example. Further, the image output unit 170 may allow a user to recognize the position of the candidate object on the screen by assigning a character string indicating the object's name and the like to each candidate object, for example.

Figure 13:
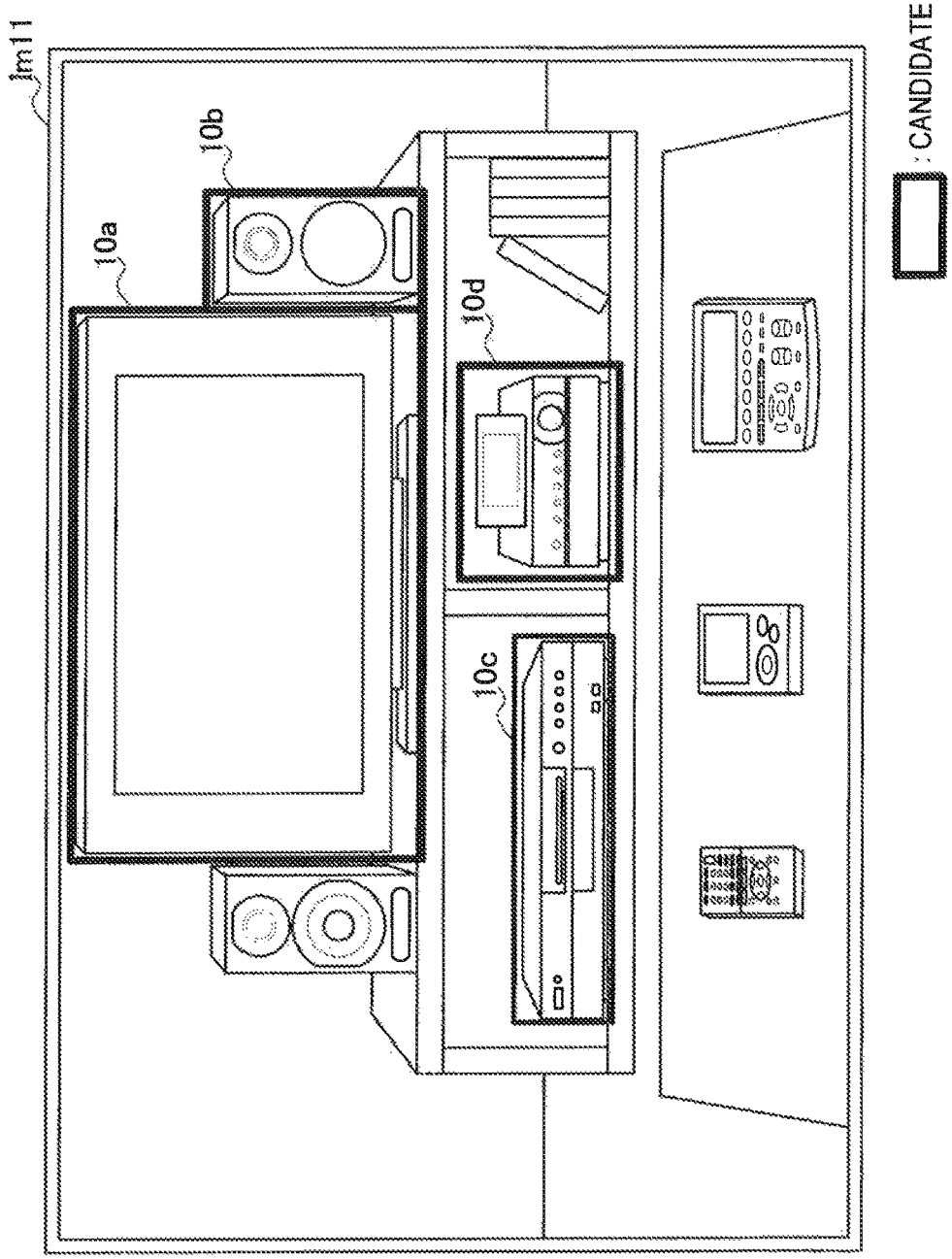
FIG. 13 is an illustrative diagram illustrating an example of an output image generated by an image output unit according to an embodiment.

FIG. 13 is an illustrative diagram illustrating an example of an output image generated by the image output unit 170 according to the embodiment. Referring to FIG. 13, an output image Im11 generated from the input image obtained by imaging the environment 1 is illustrated. In the output image Im11, on four operable objects 10a, 10b, 10c and 10d, a frame surrounding each object is placed. It should be noted that a shape of the frame may be a circle or a polygon other than a rectangle. In the example of FIG. 13, it can be understood that the four objects with the operable flag of "Yes" in the object identification data, out of the objects included in the environment map, are all selected as the candidate objects. By referring to such output image, a user can know which object existing in the environment 1 can be operated using the image processing device 100.

Figure 14:
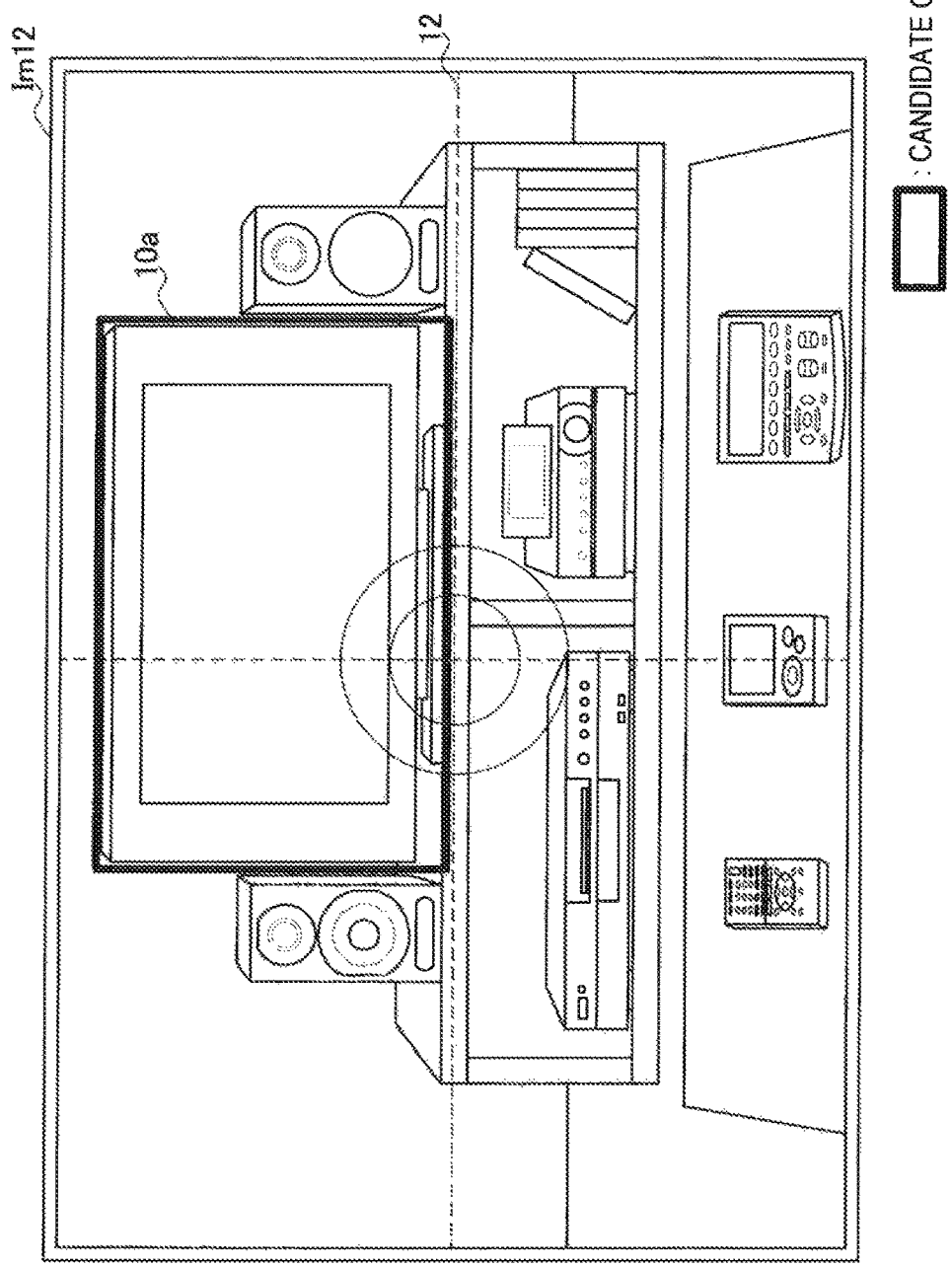
FIG. 14 is an illustrative diagram illustrating another example of an output image generated by an image output unit according to an embodiment.

FIG. 14 is an illustrative diagram illustrating another example of an output image generated by the image output unit 170 according to the embodiment. Referring to FIG. 14, an output image Im12 generated from the input image obtained by imaging the environment 1 is illustrated. In the output image Im12, on the object 10a located nearest the center of the screen, a frame surrounding the object is placed. Thus, in the example of FIG. 14, it can be understood that only one object, out of the objects included in the environment map, is selected as the candidate object. Further, an aiming symbol 12 indicating the center of the screen is also superposed on the output image Im12. With such output image, a user can easily specify an operation target by putting the aiming symbol 12 on a device intended to be set as an operation target by moving the image processing device 100 (or the imaging unit 102).

Figure 15:
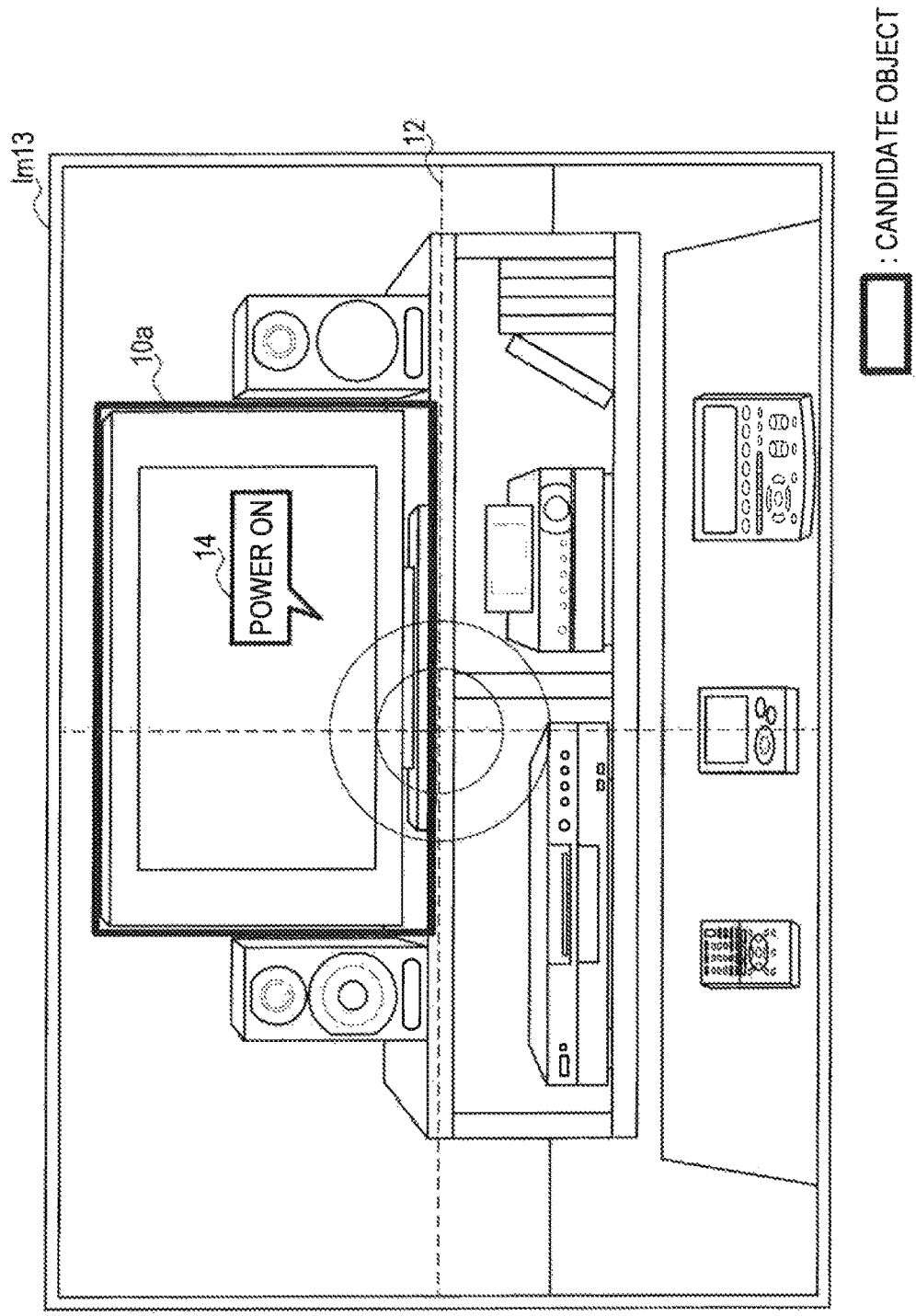
FIG. 15 is an illustrative diagram illustrating yet another example of an output image generated by an image output unit according to an embodiment.

FIG. 15 is an illustrative diagram illustrating yet another example of an output image generated by the image output unit 170 according to the embodiment. Referring to FIG. 15, an output image Im13 generated from the input image obtained by imaging the environment 1 is illustrated. In the output image Im13, on the object 10a located nearest the center of the screen, a frame surrounding the object is placed. Further, the aiming symbol 12 indicating the center of the screen is also superposed on the output image Im13. Furthermore, in the output image Im13, a command field 14 displaying a control command ("power on" in the example of FIG. 14) for operating the object is placed on the object 10a. Such control command is obtained from the command list included in the object identification data illustrated with reference to FIG. 10, for example. With such output image, a user can easily specify an operation target by moving the image processing device 100 (or the imaging unit 102) and easily select a control command to be transmitted to the operating target.

Figure 16:
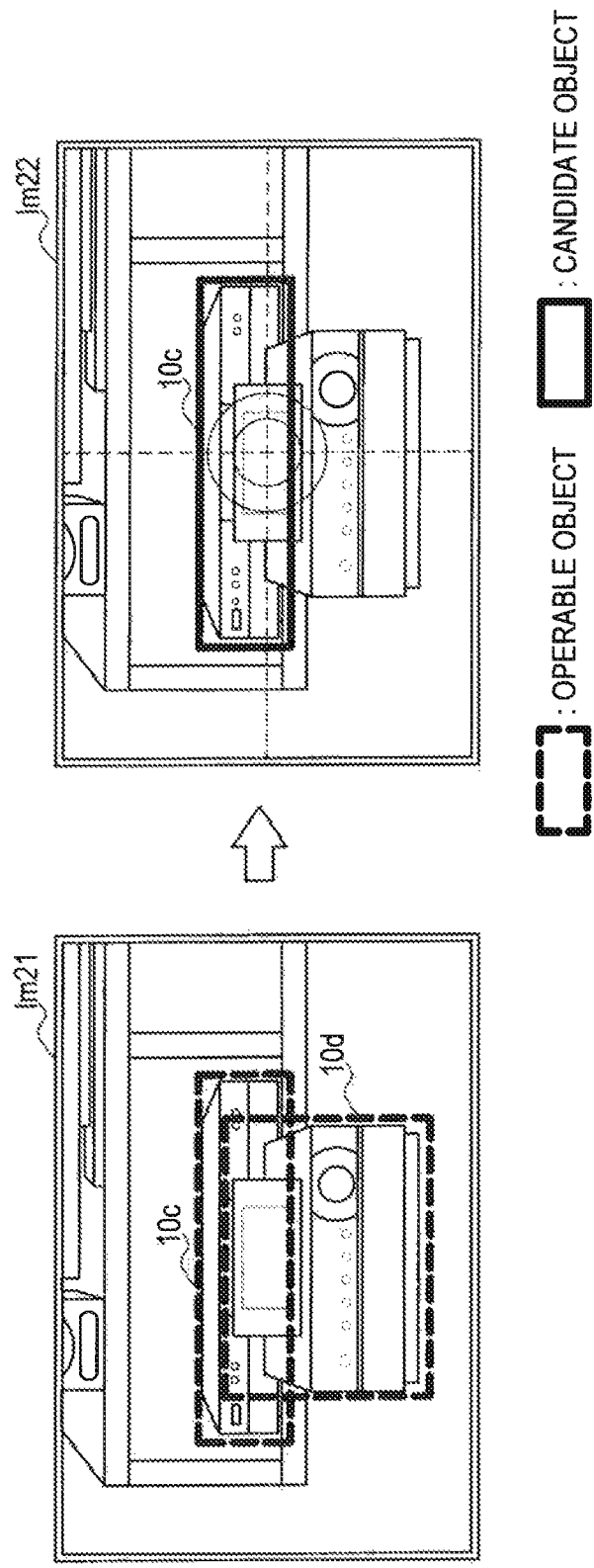
FIG. 16 is an illustrative diagram illustrating still another example of an output image generated by an image output unit according to an embodiment.

FIG. 16 is an illustrative diagram illustrating still another example of an output image generated by the image output unit 170 according to the embodiment. Referring to FIG. 16, a temporary image Im21 is illustrated on the left, and an output image Im22 is illustrated on the right. Operable objects 10c and 10d are present in the temporary image Im21. However, the object 10c is partially hidden behind the object 10d at the center of the temporary image Im21. Thus, in this case, a plurality of operable objects overlap at the center of the imaging plane. On the other hand, in the output image Im22, on the object 10c with the smaller size on the imaging plane, a frame indicating that it is the candidate object is placed. With such output image, it is possible to prevent a small operable object which overlaps with another operable object from being not selectable.

Figure 17:
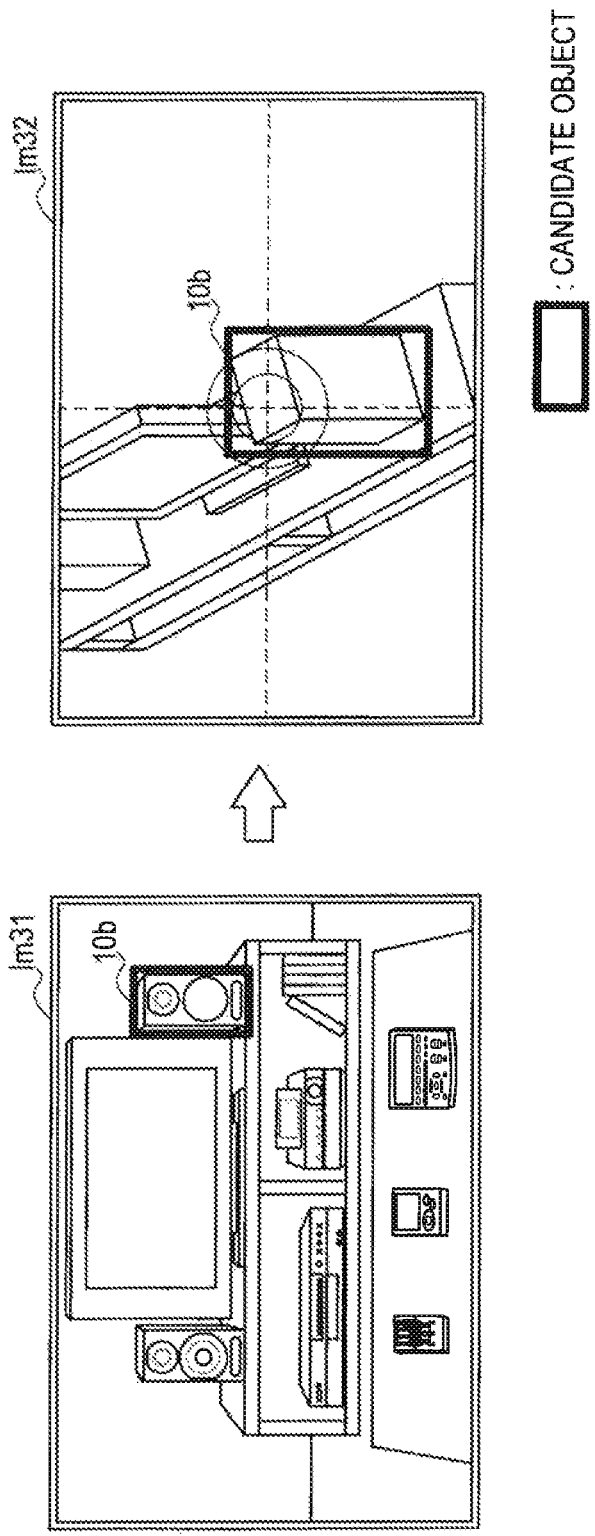
FIG. 17 is an illustrative diagram illustrating still another example of an output image generated by an image output unit according to an embodiment.

FIG. 17 is an illustrative diagram illustrating still another example of an output image generated by the image output unit 170 according to the embodiment. Referring to FIG. 17, an output image Im31 is illustrated on the left, and an output image Im32 is illustrated on the right. An operable object 10b is present in the output image Im31. It is registered that the object 10b is operable in the environment map as a result of recognition by the device recognizing unit 140. The output image Im32 is an output image that is generated later after the image processing device 100 is moved inside the environment 1. In the output image Im32 also, the operable object 10b is recognized as an operable object and selected as the candidate object. In this manner, by selecting and displaying the candidate object based on the environment map representing a position of an object present in the real space, an operation target can be selected flexibly even when appearance of the object varies depending on the imaging position and imaging direction.

Figure 18:
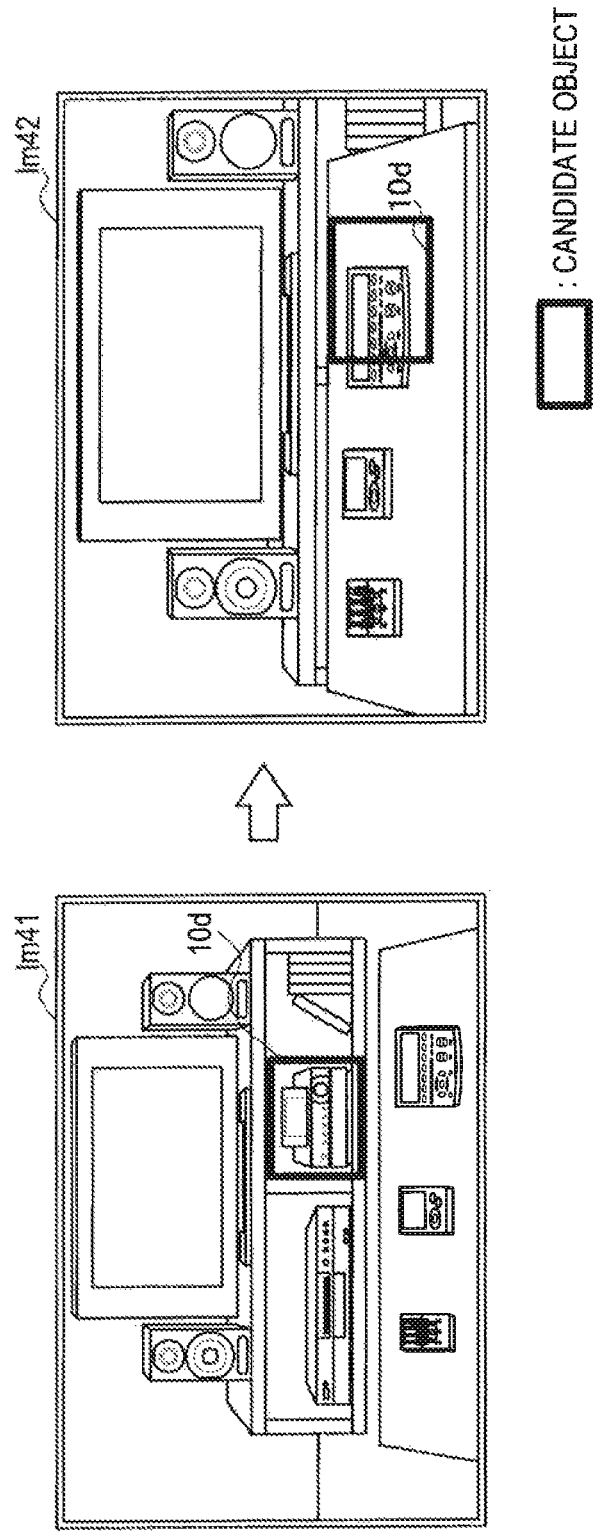
FIG. 18 is an illustrative diagram illustrating still another example of an output image generated by an image output unit according to an embodiment.

FIG. 18 is an illustrative diagram illustrating still another example of an output image generated by the image output unit 170 according to the embodiment. Referring to FIG. 18, an output image Im41 is illustrated on the left, and an output image Im42 is illustrated on the right. An operable object 10d is present in the output image Im41. It is registered that the object 10d is operable in the environment map as a result of recognition by the device recognizing unit 140. The output image Im42 is an output image that is generated later after the image processing device 100 is moved inside the environment 1. In the output image Im42, the object 10d is hidden behind the table and not visible. However, in the output image Im42 also, the object 10d hidden behind the table is selected as the candidate object. In this manner, by selecting the candidate object based on the environment map representing a position of an object present in the real space and displaying a frame which can identify the object, even when the object is hidden behind another object, the hidden object can be selected flexibly as the operation target.

It should be noted that, when an operable object is not present, the image output unit 170 may output the input image input from the imaging unit 102 as it is as an output image to a display device. Further, it is preferred that a screen of a display device on which the output image generated by the image output unit 170 is displayed and an imaging plane of an imaging device corresponding to the imaging unit 102 are arranged to face opposite directions from each other (that is, with their backsides facing each other). This produces a see-through type display, thereby enabling a user to more easily specify an object to be operated, looking at the output image by holding up the image processing device 100 in the environment 1.

[2-8. User Interface]

The user interface 180 provides an interface for allowing a user to specify an object to be operated among the candidate objects. The user interface 180 may be an optional input means capable of detecting user input, such as a button, a touch panel, a switch or a keypad, for example. When only one candidate object is displayed as in the output image Im12 of FIG. 14 or the output image Im22 of FIG. 16, for example, the candidate object displayed at the time when user input (pressing of a button, for example) is detected may be determined as the object to be operated. Further, when a plurality of candidate objects are displayed as in the output image Im11 of FIG. 13, for example, the object located at the center or near the center of the output image displayed at the time when user input is detected may be determined as the object to be operated. Furthermore, when a plurality of candidate objects are located at the center of the output image when user input is detected, the user interface 180 may determine the candidate object with the smallest size in the output image as the object to be operated, for example. In addition, the user interface 180 may include a graphical user interface (GUI). For example, the command field 14 in the output image Im13 in FIG. 15 is a type of the GUI. When a user selects a control command displayed in the command field 14 on the screen, for example, the transmitting unit 190 to be described next may transmit a control signal containing the control command to the operation target object on which the command field 14 is placed.

[2-9. Transmitting Unit]

The transmitting unit 190 generates a control signal containing the control command to the operation target object determined based on user input to the user interface 180 and transmits the generated control signal. The control signal may be transmitted as an infrared signal in conformity to Infrared Data Association (IrDA), for example. Alternatively, the control signal may be transmitted as a radio signal through a wireless Local Area Network (LAN), for example. Such control signal is received by the operation target object (controlled device), and an operation desired by a user is performed in the object.

3. Hardware Configuration

Note that, it does not matter whether a series of processes by the above-described image processing device 100 are realized by hardware or software. When a series of processes or a part of the same is executed by software, a program composing the software is executed using a computer incorporated in dedicated hardware or a general-purpose computer illustrated in FIG. 19, for example.

Figure 19:
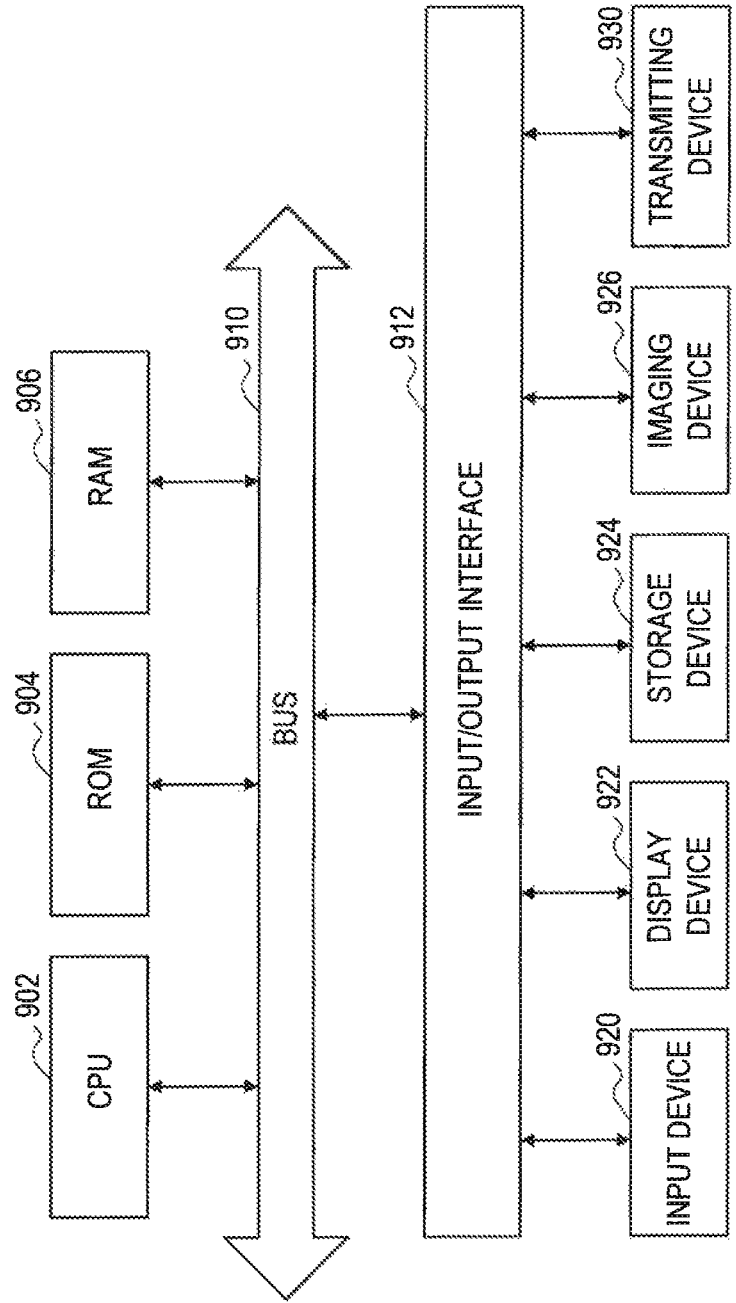
FIG. 19 is a block diagram illustrating an example of a hardware configuration of a general-purpose computer.

In FIG. 19, a central processing unit (CPU) 902 controls entire operation of the general-purpose computer. A program or data in which a part of or an entire of the series of processes is described is stored in a read only memory (ROM) 904. The program and data used by the CPU 902 when executing the process are temporarily stored in a random access memory (RAM) 906.

The CPU 902, the ROM 904 and the RAM 906 are connected to each other through a bus 910. An input/output interface 912 is further connected to the bus 910.

The input/output interface 912 is the interface to connect the CPU 902, the ROM 904 and the RAM 906, and an input device 920, a display device 922, a storage device 924, an imaging device 926 and a transmitting drive 930.

The input device 920 accepts user input through an input means such as a button, a touch panel, a switch, or a keyboard, for example. The display device 922 is composed of a cathode ray tube (CRT), a liquid crystal display, an organic light emitting diode (OLED) and the like, for example, and displays the output image on a screen thereof.

The storage device 924 is composed of a hard disk drive or a semiconductor memory, for example, and stores the program and the data. The imaging device 926 corresponds to the hardware of the above-described imaging unit 102 and images the real space using the imaging element such as the CCD or the CMOS. The transmitting drive 930 is composed of an infrared port conforming to the IrDA and the like, for example, and modulates the control signal containing the control command for remotely controlling an electronic device into an infrared signal and the like and transmits the signal.

4. Summary

The image processing device 100 according to one embodiment of the present invention is described above with reference to FIGS. 1 to 19. According to the image processing device 100, at least one object recognized as being operable based on the object identification data, out of the objects included in the environment map representing positions of one or more objects present in the real space, is selected as the candidate object, which is a possible operation target by a user. Therefore, even when appearance of an object in the input image varies due to movement of the imaging device or when an object to be operated is hidden behind another object, it is possible to distinguish between those objects and easily select one as a target of remote control. Further, intuitive selection of an operation target using a see-through type display is possible. Furthermore, it is possible to operate each electronic device using the single image processing device 100 without separately providing displays for operation with respective electronic devices or without preparing different dedicated remote control devices.

Further, the position and the posture of the imaging device used when generating the output image are detected dynamically by applying the SLAM technology. Therefore, even when the position and the posture of the imaging device vary from picture to picture, it is possible to appropriately generate the frame surrounding the candidate object to be displayed on the output image and the like according to the position and the posture of the imaging device.

5. Alternative Example

Figure 20:
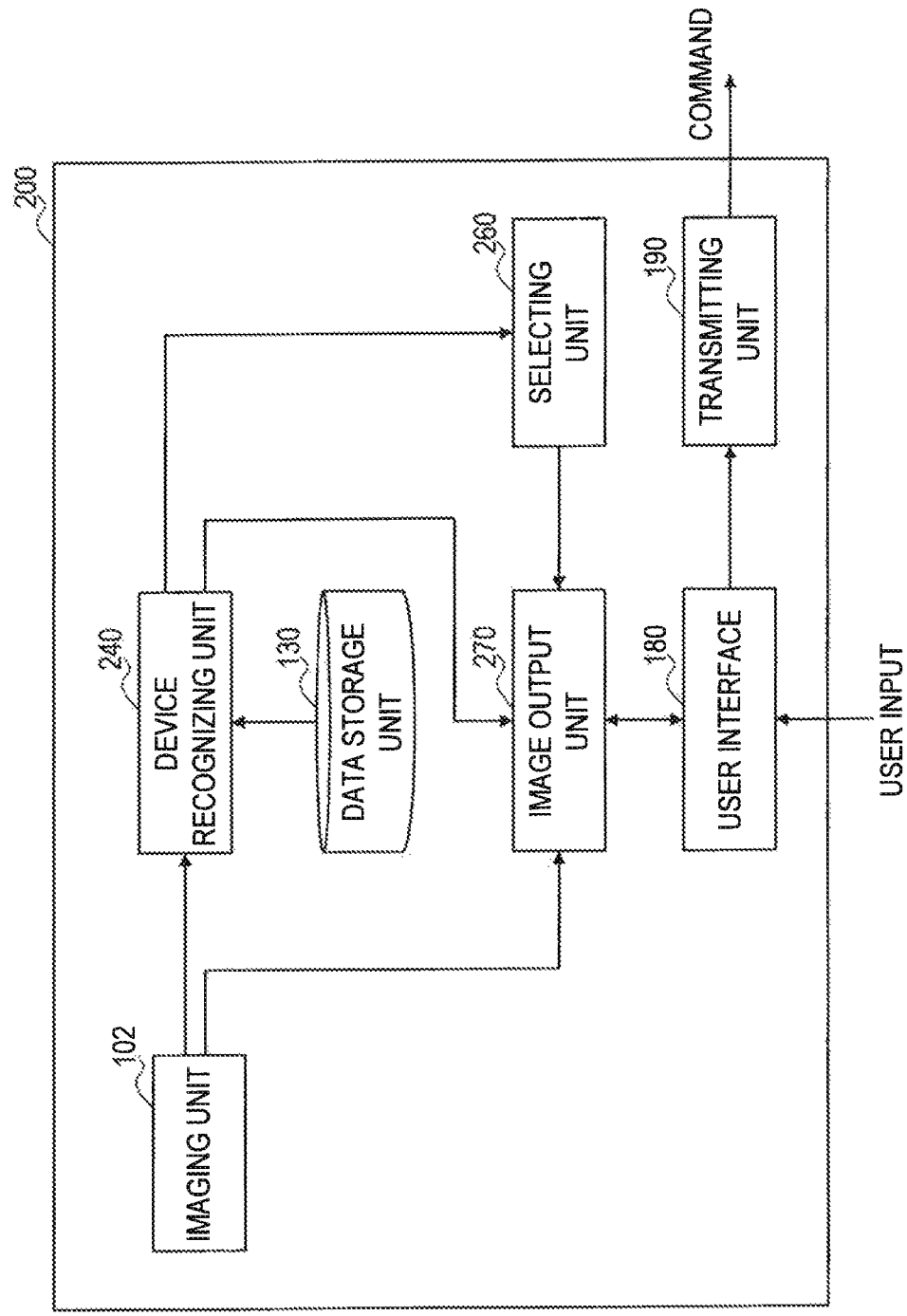
FIG. 20 is a block diagram illustrating an example of a configuration of an image processing device according to an alternative example.

Note that, as an alternative example of the above-described image processing device 100, an image processing device which can operate as a remote control device without building the environment map may be configured. FIG. 20 is a block diagram illustrating an example of a configuration of an image processing device 200 according to such alternative example. Referring to FIG. 20, the image processing device 200 includes an imaging unit 102, a data storage unit 130, a device recognizing unit 240, a selecting unit 260, an image output unit 270, a user interface 180, and a transmitting unit 190.

The device recognizing unit 240 matches each object image included in the object identification data stored in the data storage unit 130 against the input image input from the imaging unit 102 to thereby recognize an operable object present in the input image. Then, when the operable object exists, the device recognizing unit 240 outputs a position of each operable object in the input image (a position of a pixel group corresponding to each object and the like), in relation to the object ID, to the selecting unit 260 and the image output unit 270.

The selecting unit 260 selects at least one object recognized as being operable based on the object identification data by the device recognizing unit 240 as a candidate object. The selecting unit 260 may select all the objects with the operable flag of "Yes" in the object identification data as the candidate object, for example. Alternatively, when a plurality of operable objects are recognized in the input image, for example, the selecting unit 260 may select only certain objects of a number not exceeding a preset threshold as the candidate objects. The certain objects may be objects located at the center or near the center of the screen, for example. Further, when a plurality of operable objects are located at the center of the screen, for example, the selecting unit 260 may select the object with the smallest size on the screen as the candidate object. The selecting unit 260 outputs the object ID of the selected candidate object to the image output unit 270.

The image output unit 270 generates an output image for allowing a user to recognize the position on the screen of the candidate object selected by the selecting unit 260 from the input image input from the imaging unit 102. The image output unit 270 then outputs the generated output image to a display device. Specifically, the image output unit 270 generates the output image by generating a frame surrounding each candidate object on the screen based on the position of the candidate object input from the device recognizing unit 240 and superposing the generated frame on the input image, for example. A user can specify an operation target through the user interface 180, looking at such output image.

It should be noted that, when an operable object is not present, the image output unit 270, like the above-described image output unit 170, may output the input image input from the imaging unit 102 as it is as an output image to a display device. Further, it is preferred that a screen of a display device on which the output image generated by the image output unit 270 is displayed and an imaging plane of an imaging device corresponding to the imaging unit 102 are arranged to face opposite directions from each other.

According to the image processing device 200, at least one object in the input image recognized as being operable based on the object identification data is selected as the candidate object, which is a possible operation target by a user, and displayed in the output image. Therefore, a user can intuitively select an operation target. In this case also, it is possible to operate each electronic device using the single image processing device 200 without separately providing a display for operation to the electronic device or without preparing a separate dedicated remote control device.

Although preferred embodiments of the present invention are described in detail above with reference to the appended drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
    circuitry configured to
        acquire a position or posture information of an imaging device, the position or posture information being determined based on at least two images of a real space captured by the imaging device and also based on a movement information of the imaging device, and
        initiate a displaying of information related to an electronic device that is within the real space, regardless of whether or not the electronic device is captured within a current captured image of the imaging device.

2. The image processing apparatus according to claim 1, wherein the circuitry is further configured to initiate a displaying of an output image that includes a candidate object and a marker associated with the candidate object.

3. The image processing apparatus according to claim 2, wherein the marker comprises a frame that highlights the candidate object.

4. The image processing apparatus according to claim 2, wherein the candidate object corresponds to the electronic device that is within the real space.

5. The image processing apparatus according to claim 1, wherein the circuitry is further configured to initiate a displaying of a temporary image prior to a displaying of an output image,
    wherein the temporary image includes a plurality of operable objects, and the output image includes a candidate object selected from the plurality of operable objects.

6. The image processing apparatus according to claim 1, further comprising:
    a see-through display upon which the information related to the electronic device is displayed.

7. The image processing apparatus according to claim 1, wherein the electronic device is selected by input received through a user interface.

8. The image processing apparatus according to claim 7, wherein the received input is a gaze input.

9. The image processing apparatus according to claim 1, wherein the circuitry is further configured to initiate a displaying of a first output image that includes a candidate object that is recognized as an operable object.

10. The image processing apparatus according to claim 9, wherein when the imaging device is moved to a position that is captured within the at least two images of the real space, the circuitry is further configured to initiate a displaying of a second output image that includes the candidate object recognized as an operable object.

11. The image processing apparatus according to claim 10, wherein the second output image depicts the candidate object recognized as an operable object from a perspective that is different than that depicted by the first output image.

12. The image processing apparatus according to claim 1, wherein the information related to the electronic device within the real space contains multiple pieces of command information representing corresponding control commands for operating the electronic device.

13. The image processing apparatus according to claim 1, wherein the electronic device is selected from among a plurality of candidate objects based on at least one of
    a feature of the candidate objects,
    a size of the candidate objects in the input image,
    a location of the candidate objects, and
    command information specified by a user.

14. The image processing apparatus according to claim 1, wherein the electronic device is at least partially hidden in the at least two images of the real space captured by the imaging device.

15. The image processing apparatus according to claim 1, further comprising a storage unit that stores positioning information of the real space.

16. The image processing apparatus according to claim 15, wherein the positioning information of the real space is a three-dimensional positioning information.

17. An image processing method executed via at least one processor, the method comprising:
    acquiring a position or posture information of an imaging device, the position or posture information being determined based on at least two images of a real space captured by the imaging device and also based on a movement information of the imaging device; and
    display information related to an electronic device that is within the real space, regardless of whether or not the electronic device is captured within a current captured image of the imaging device.

18. A non-transitory computer-readable medium having embodied thereon a program, which when executed by a computer causes the computer to execute a method, the method comprising:
    acquiring a position or posture information of an imaging device, the position or posture information being determined based on at least two images of a real space captured by the imaging device and also based on a movement information of the imaging device; and
    display information related to an electronic device that is within the real space, regardless of whether or not the electronic device is captured within a current captured image of the imaging device.

* * * * *